US008583956B2

(12) United States Patent
Fong et al.

(10) Patent No.: US 8,583,956 B2
(45) Date of Patent: *Nov. 12, 2013

(54) INTERACTIVE DEVICE WITH LOCAL AREA TIME SYNCHRONIZATION CAPBILITY

(75) Inventors: Peter Sui Lun Fong, Monterey Park, CA (US); Kelvin Yat-Kit Fong, Monterey Park, CA (US); Chun Yan Liu, Shenzhen (CN)

(73) Assignee: Peter Sui Lun Fong, Monterey Park, CA (US)

( * ) Notice: Subject to any disclaimer, the term of this patent is extended or adjusted under 35 U.S.C. 154(b) by 575 days.

This patent is subject to a terminal disclaimer.

(21) Appl. No.: 12/577,957

(22) Filed: Oct. 13, 2009

(65) Prior Publication Data

US 2010/0068970 A1 Mar. 18, 2010

Related U.S. Application Data

(63) Continuation-in-part of application No. 12/023,783, filed on Jan. 31, 2008, now Pat. No. 8,046,620.

(51) Int. Cl.
*G06F 1/12* (2006.01)
*A63H 3/00* (2006.01)

(52) U.S. Cl.
USPC ............................ 713/400; 446/297; 446/484

(58) Field of Classification Search
USPC .................................. 713/400; 446/297, 484
See application file for complete search history.

(56) References Cited

U.S. PATENT DOCUMENTS 5,677,895 A 10/1997 Mankovitz
5,752,880 A * 5/1998 Gabai et al. ....................... 463/1
6,554,679 B1 4/2003 Shackelford et al.
7,068,941 B2 6/2006 Fong
7,269,676 B2 9/2007 Yoon
8,046,620 B2 * 10/2011 Fong et al. .................... 713/400
8,271,822 B2 * 9/2012 Fong et al. .................... 713/400
2002/0172095 A1 11/2002 Pandipati et al.
2003/0129922 A1 * 7/2003 Curran et al. ................. 446/484
2004/0038620 A1 2/2004 Small et al.
2004/0117858 A1 6/2004 Boudreau et al.
2005/0226201 A1 10/2005 McMillin
2006/0217967 A1 9/2006 Goertzen et al.
2007/0087791 A1 4/2007 Feeney et al.
2007/0128979 A1 * 6/2007 Shackelford et al. ......... 446/484
2009/0054068 A1 2/2009 Halkka et al.
2009/0199034 A1 8/2009 Fong et al.

OTHER PUBLICATIONS

European Patent Office Search Report for EP09708899.1.
Written Opinion for PCT/US2010/052092.
Written Opinion for PCT/US2009/31407.

* cited by examiner

*Primary Examiner* — Chun Cao
(74) *Attorney, Agent, or Firm* — Stetina Brunda Garred & Brucker

(57) ABSTRACT

An interactive device with local area time synchronization is contemplated. The device includes a communications module linkable to a corresponding communications module of one or more other interactive devices. There is also memory for storing a set of clock values including a time component, a date component, a daylight savings component, and an event component. A computer processor connected to the communications module and the memory is also included, and is programmed to actively maintain an actively maintained real-time clock based upon the set of clock values stored in the memory. The set of clock values stored in the memory is transferrable by the communications module to a corresponding clock of one or more other interactive devices.

35 Claims, 21 Drawing Sheets

INTERACTIVE DEVICE WITH LOCAL AREA TIME SYNCHRONIZATION CAPBILITY

CROSS-REFERENCE TO RELATED APPLICATIONS

The present application is a continuation-in-part application of U.S. patent application Ser. No. 12/023,783, filed Jan. 31, 2008 now U.S. Pat. No. 8,046,620 entitled "INTERACTIVE DEVICE WITH TIME SYNCHRONIZATION CAPABILITY," the entirety of the disclosure of which is incorporated by reference herein.

STATEMENT RE: FEDERALLY SPONSORED RESEARCH/DEVELOPMENT

Not Applicable

BACKGROUND

1. Technical Field

The present invention relates to an interactive device with local area time synchronization capabilities, and more particularly to an apparatus, system, and method for programming interactive devices such that internal clocks of the interactive devices are time synchronized.

2. Related Art

Children are often attracted to interactive toys that provide both visual and audio stimulation. As a result, there are a number of articulated and animated toys capable of interacting with children in ways that appear intelligent. Amongst those known in the art and are commercially available include Furby® from Tiger Electronics, Ltd., and Barney® from MicroSoft, Inc. These toys are capable of understanding speech, speaking in a natural language and demonstrating limited animation such as mouth, eye and ear, movements.

Market demands compel creative manufacturers to take traditional, mechanical toys and educational materials and transform them into interactive electronic devices. As expected, such interactive devices appeal to consumers more than their traditional counterparts. However, certain interactive devices require an exhaustive setup procedure that may dissuade consumers from purchasing them. Therefore, oftentimes such interactive devices come preprogrammed by the manufacturer to relieve the user of the burden of having to perform a tedious setup procedure.

Manufacturers are continuously attempting to implement procedures in an effort to streamline the production of such interactive devices. A setup computer or system is often used for streamlining production in order to quickly and efficiently program the devices. This is especially advantageous when the manufacturer has a large number of devices to produce. However, certain interactive devices may require a more extensive setup procedure than other devices. For those devices that include calendar and clock functionality, known systems are currently lacking a quick, efficient, and cost effective protocol for synchronizing the time at the point of origin, such that the internal clock of each device reads the same or approximately the same time corresponding to an ultimate shipment destination for such devices.

One of the advantages of having time-synchronized devices is that each device may generate a triggered response at approximately the same time. Such devices may be more marketable to consumers when viewed upon a retailer's shelf generating audio and visual messages in concert. Another one of the advantages of having time-synchronized devices is that the ultimate purchaser may be excused from the burden of having to undertake a time consuming, difficult programming task as would otherwise be needed to cause the device to function in the desired manner.

A particular interactive device that may benefit from time synchronization at the point of manufacture is a customizable calendar. An example of a customizable calendar is an Advent calendar. An Advent calendar is a popular holiday calendar that counts down the days to Christmas. The traditional Advent calendar, as illustrated in FIG. 1, consists of two pieces of cardboard on top of each other where twenty-four doors are cut out in the top layer creating specific compartments, with one compartment door being opened every day from December 1 to December 24 (Christmas Eve). Each compartment can either show a part of the Nativity story, or can simply display a piece of paraphernalia having to do with Christmas (e.g. Bells, holly).

An electronic adaptation embedding the functionality of an Advent calendar 1 into an interactive device requires the device (i.e., the interactive Advent device) to generate a response indicative of when to open a particular compartment door based upon date and time. In this regard, the interactive Advent device must be programmed relative to the calendar and clock parameters of a traditional Advent calendar in that it must have an internal calendar and clock which is capable of counting down the days to Christmas. Furthermore, the functionality of the interactive Advent device must generate an instruction or an alarm, at a set time, instructing the user to take action relative to the opening a box in a traditional Advent calendar. Therefore, for the reasons discussed above, it would be advantageous for each interactive Advent device to be time-synchronized at the point of manufacture such that the devices run precisely the same date and time corresponding to their ultimate shipment destination. Having a global marketplace allows products like an interactive Advent device to be manufactured, marketed, and sold all over the world; therefore various local customs, such as daylight savings, must also be incorporated into the program. Consequently, the programming of such devices is made difficult as a result of mass production and would require a great deal of manpower and associated costs to individually program each device such that they are time synchronized in a prescribed manner.

Therefore, there is currently a need in the art for an apparatus, method, and system for streamlining the time synchronization capability of an interactive device, such as an interactive Advent device, such that it is efficient, low cost, and versatile to adapt to customized parameters.

BRIEF SUMMARY OF THE INVENTION

According to an embodiment of the present invention, an interactive device is contemplated. The interactive device may include a communications module linkable to a corresponding communications module of another interactive device. Additionally, the interactive device may include a memory for storing a set of clock values including a time component, a date component, a daylight savings component, and an event component. There may also be a computer processor connected to the communications module and the memory. The computer processor may be programmed to actively maintain a clock based upon the set of clock values stored in the memory. The set of clock values stored in the memory may be transferrable by the communications module to a corresponding clock of the other interactive devices. The set of clock values may be stored in a corresponding memory of the other interactive devices.

According to another embodiment, there is provided a method for synchronizing clocks of one or more secondary interactive devices from a primary interactive device. The method may include receiving an initial set of clock values on a primary interactive device. Furthermore, the method may include setting a status token on the primary interactive device. Thereafter, the method may include transmitting a synchronization message to one or more secondary interactive devices. The synchronization message may include an actively maintained real time clock values based upon the initial set of clock values stored in the memory of the primary interactive device and the status token. The method may also include receiving a confirmation message from secondary interactive devices. The confirmation message may include updated sets of clock values that are each retrieved from the respective one of the secondary interactive devices.

The present invention is best understood by reference to the following detailed description when read in conjunction with the accompanying drawings.

BRIEF DESCRIPTION OF THE DRAWINGS

These, as well as other features of the present invention, will become more apparent upon reference to the drawings wherein.

Common reference numerals are used throughout the drawings and detailed description to indicate like elements.

DETAILED DESCRIPTION OF THE INVENTION

Figure 1:
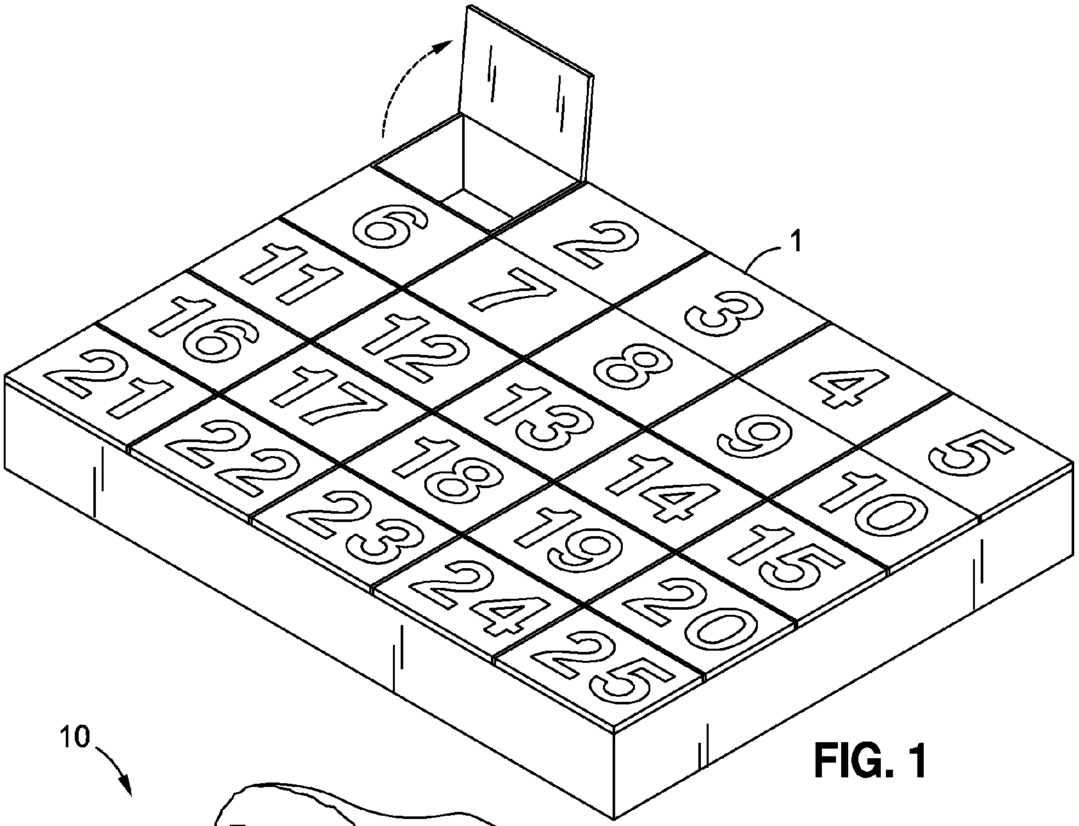
FIG. 1 depicts a traditional Advent calendar that is used in conjunction with an embodiment of the present invention to count down the days to Christmas.
Figure 2:
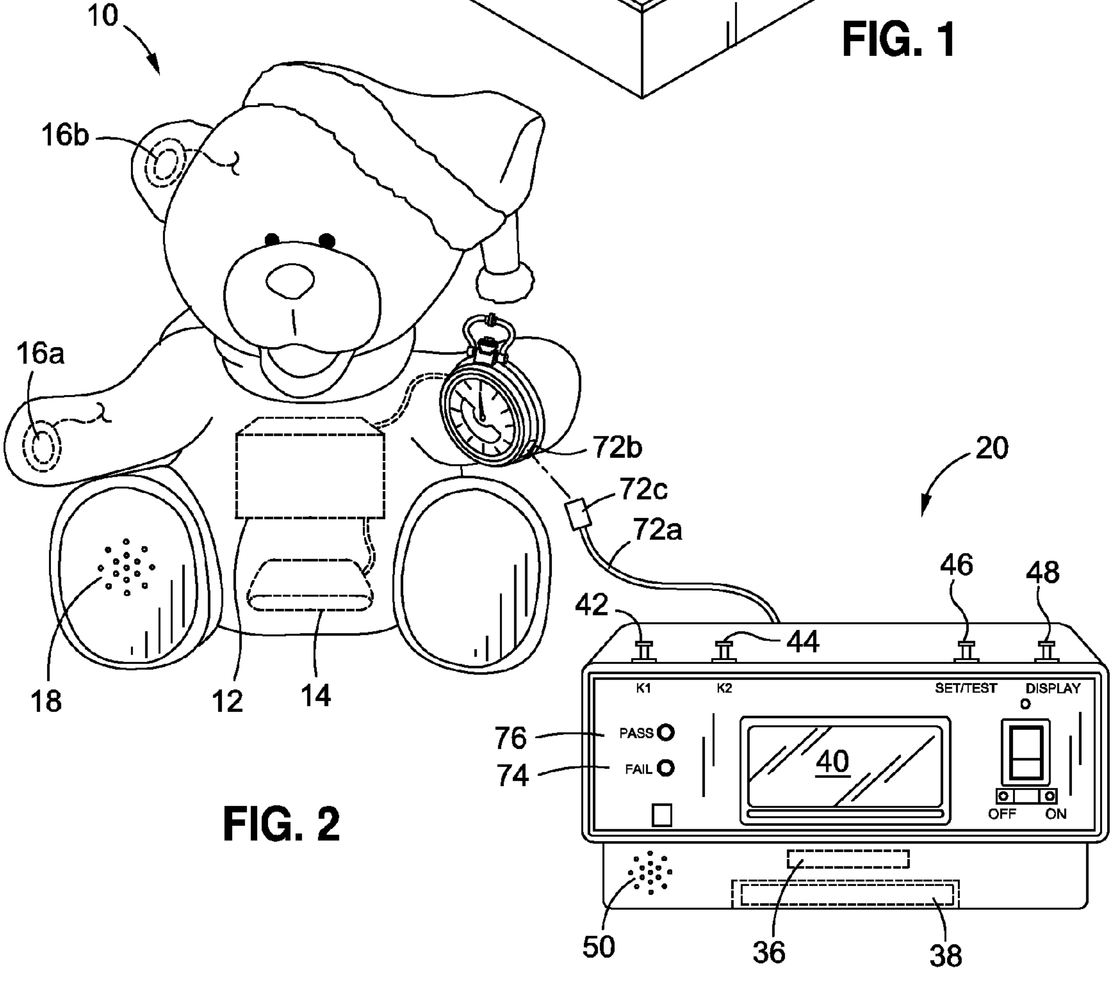
FIG. 2 depicts one embodiment of the interactive device of the present invention wherein the interactive device is fashioned as a teddy bear and a setup module of the present invention is provided in a stand alone configuration.

Referring now to the drawings wherein the showings are for purposes of illustrating various embodiments of the present invention only, and not for purposes of limiting the same, FIG. 2 depicts an interactive device 10 and a setup module 20 constructed in accordance with the present invention. The interactive device 10 is a programmable device that comprises a computer processor 12, an internal battery 14, an input means and an output means. In the present embodiment, the interactive device 10 is fashioned as common children's toy, a teddy bear. The teddy bear is adorned with seasonal attributes, such as the stocking cap. Such aesthetics are rendered for marketability of the product. A person having ordinary skill in the art would recognize that the interactive device 10 may be fashioned into a variety of home or office decorative items, lighting products such as lamps, nightlights, Christmas light sets, a decorative display or device, seasonal decorative products such as ornaments, baby products, or children's toys, such as crib toys, a doll, a plastic or fabric figure, a plastic or fabric toy animal, a robot, a vehicle, electronic games, play sets, party products, electronic greeting cards, digital cameras, video recorders, or the like, and that the depiction of the teddy bear in FIG. 2 is exemplary only.

In the present embodiment, the computer processor 12 is programmable to run a software program which includes a clock calendar program, a daylight savings program, and a daily alarm and announcements program. A person having ordinary skill in the art would recognize that a computer processor 12 being versatile in scope is capable of running a multitude of programs with varying functionality. Software run on the computer processor 12 is generally directed towards specific attributes the interactive device 10 possesses. The current embodiment of the present invention carries the functionality of an Advent calendar like the above-described Advent calendar 1. In this regard, the programming carries the requisite logic to employ an Advent calendar 1. It is not the intention of the interactive device 10 to replace an Advent calendar 1, but rather to complement it. More specifically, the interactive device 10 is programmed to countdown the days to Christmas, and accordingly provides instructions as to when to open the appropriate correlated box upon the Advent calendar 1.

Figure 3:
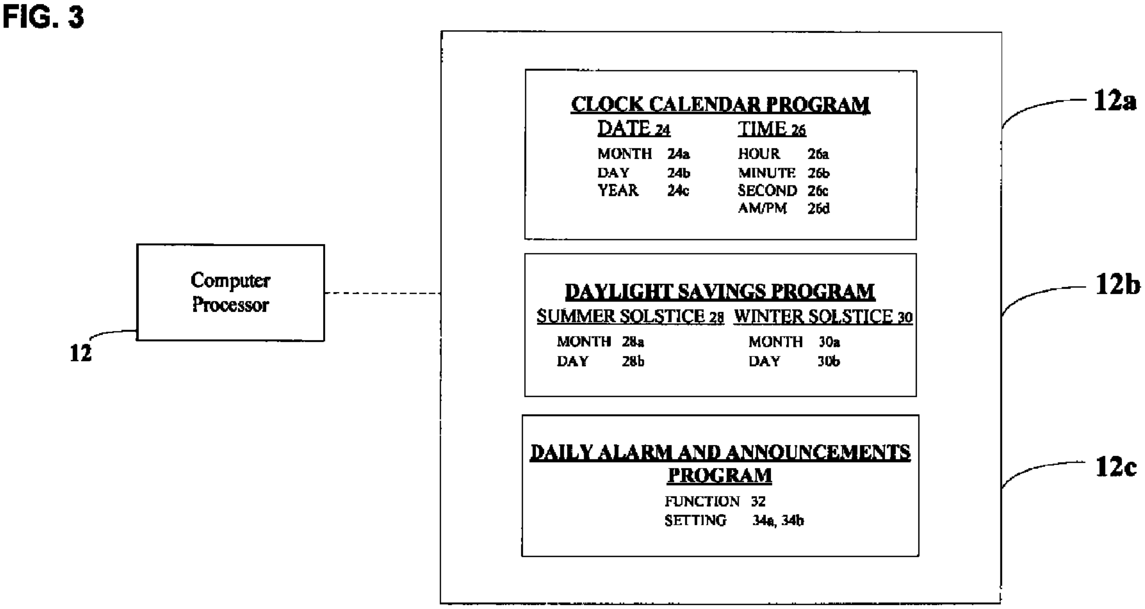
FIG. 3 depicts a software architecture block diagram, representing the data structures of each program run in an interactive device.

The software architecture block diagram in FIG. 3 illustrates how the programs collectively work to provide the functionality of the Advent calendar 1. The computer processor 12 invokes each of the programs 12*a*-12*c* in the appropriate order. The calendar clock program 12*a* generally will be the first program invoked. Its function is to serve as the internal clock of the interactive device 10. More specifically, the clock calendar program 12*a* will set, actively maintain and display the time of day and date of the interactive device 10. The clock calendar program 12*a* carries out the functions of a traditional clock and calendar, in that it records date and time and is adjustable.

Next, the daylight savings program 12*b* is invoked. The daylight savings program takes into account daylight savings, a time-related phenomenon that is observed in some parts of the world. In this regard, the daylight savings program 12*b* takes into account the summer and winter solstice dates, upon the arrival of which the time of day is adjusted by one hour either forward or backward, respectively. The observance of daylight savings is not recognized worldwide; therefore the functionality may be disabled if inapplicable to a particular locale. If the winter and summer solstice dates are programmed, the clock calendar program 12*a* automatically adjusts itself accordingly based upon those appropriate dates.

Finally, the daily alarm and announcements program 12*c* is invoked. The daily alarm and announcements program 12*c* allows a user to specify an occasion on which to trigger an alarm or an announcement. Events, such as birthdays, holidays, local seasons, religious holidays and events, and the like, may be programmed into the daily alarm and announcements program 12*c*. In the present embodiment, the daily alarm and announcements program 12*c* stores the relevant dates counting down the days to Christmas. Each alarm and announcement stored in the daily alarm and announcements program 12*c* is triggered when the clock calendar program 12*a* hits that target date or time. For example, if the daily alarm and announcements program 12*c* has a stored alarm for December 1 at 10:00 AM, upon the clock calendar program 12*a* reaching December 1 and 10:00 AM, the daily alarm and announcements program 12*c* generates, "Today is December 1, there are 24 days to Christmas, Open the first box of your Advent Calendar."

Referring back to FIG. 2, the interactive device 10 may be programmed or adjusted ad hoc by the user, or come preprogrammed by the manufacturer. The user may program the interactive device 10 by utilizing the input means to set the values of the clock calendar program 12*a* the daylight savings program 12*b*, and the daily alarm and announcements program 12*c*. In the present embodiment, the computer processor 12, internal battery 14, input means and output means are seamlessly integrated within the interactive device 10. The requisite functional components of the interactive device 10 are designed to be minimally obstructive. A person having ordinary skill in the art would understand that the functional components of the interactive device 10 may be positioned in a variety of formats, so long as they do not disparage the creative appeal of the interactive device 10.

Figure 4:
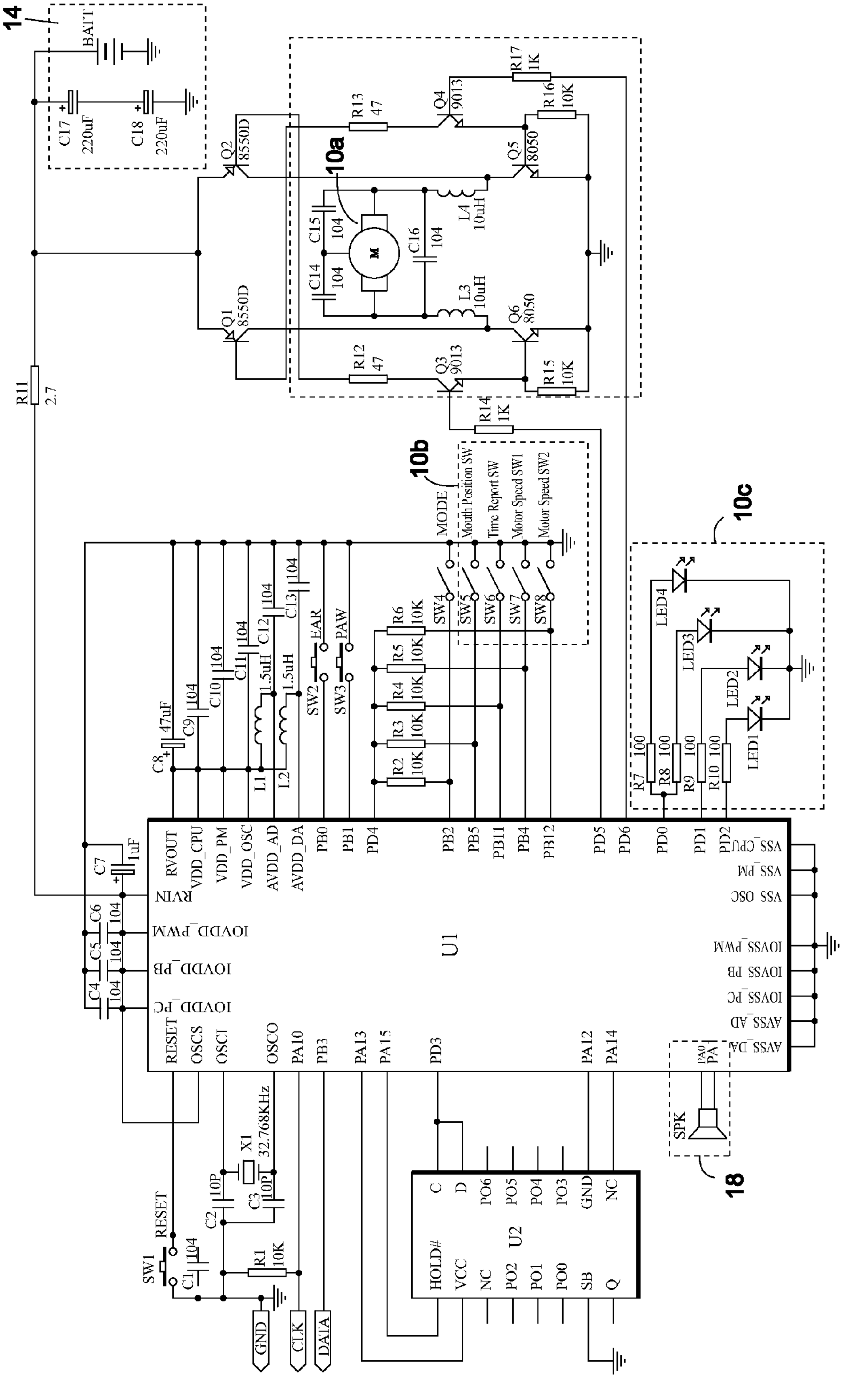
FIG. 4 depicts the electrical schematics of an embodiment of an interactive device, wherein the interactive device, fashioned as a teddy bear in an exemplary manner, is further equipped with a motor and a series of actuators providing the device the capability to mimic human action.

In the interactive device 10, the input means may comprise buttons or switches 16*a*, 16*b* strategically positioned in the paw and ear of the toy and the output means is an internal speaker 18. The input switches 16*a*, 16*b* are used for the input of values and the activation of programs 12*a*-12*c* in the interactive device 10, as will be discussed in more detail below. The interactive device 10 also includes a three position switch (not shown) located at the compartment for the internal battery 14, such switch being used to turn the interactive device 10 on and off and also to optionally place the interactive device 10 into either a "try-me" mode or a "play" mode. The output means may be an internal speaker 18, which generates audible messages to the user. FIG. 4 illustrates the schematics of the interactive device 10. The input switches 16*a*, 16*b* (corresponding to respective ones of SW3 and SW2) are used for the input of values and for the activation of programs 12*a*-12*c*, as indicated above.

Figure 5:
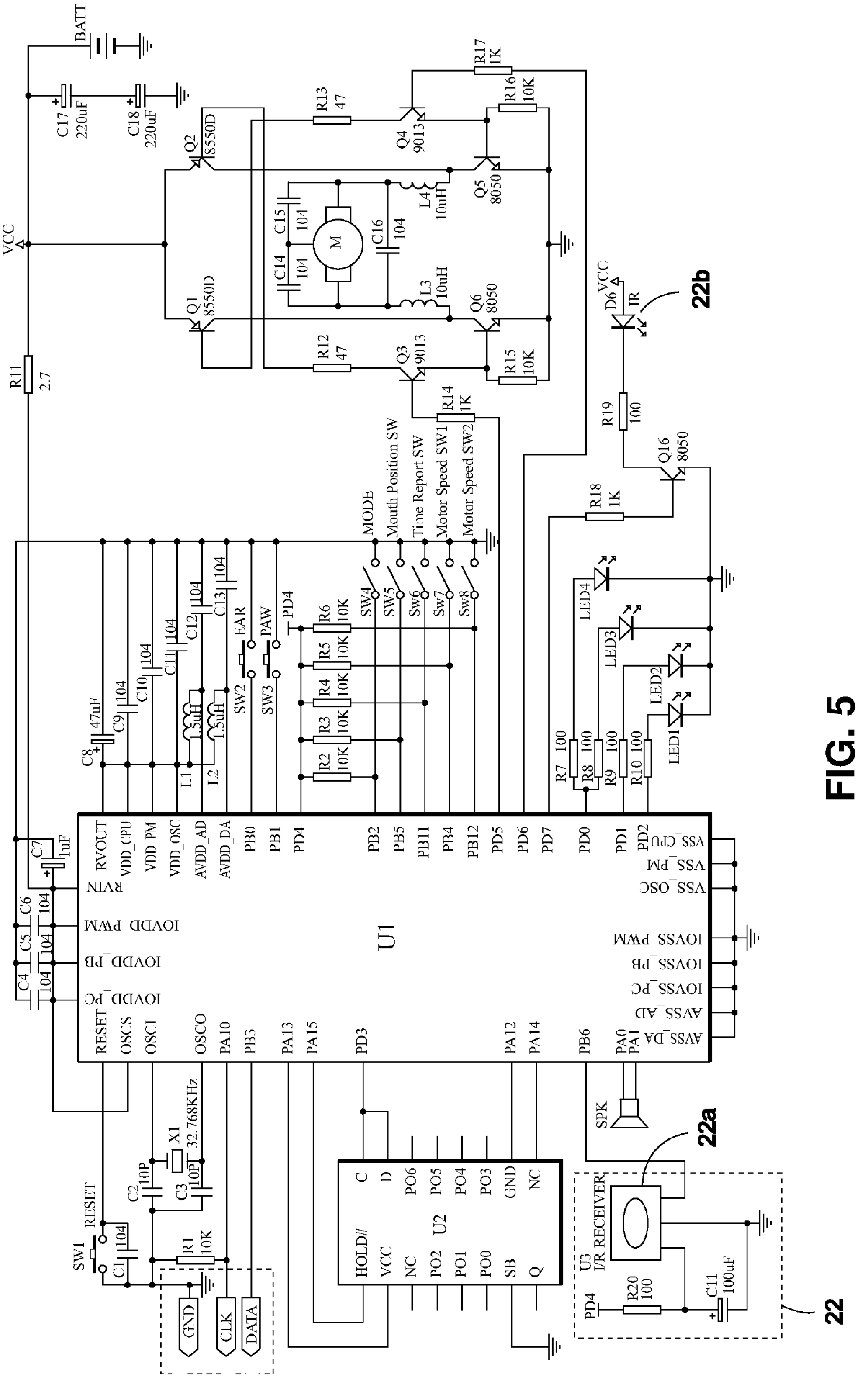
FIG. 5 depicts the electrical schematics of an exemplary embodiment of an interactive device, wherein the interactive device is equipped with an infrared receiver from which to receive data.

An exemplary embodiment of the present invention may exploit wireless technology as an input means. In this regard, FIG. 5 depicts the schematics of an alternative exemplary embodiment of the interactive device 10 utilizing an infrared receiver 22*a* as an input means. It is contemplated that a person having ordinary skill in the art would understand that, in this particular embodiment, a user may input values into an interactive device 10 by operating a device which has infrared transmission capability. It is also contemplated that in this alternative embodiment, the interactive device 10 may be provided with an infrared transmitter 22*b* that allows the interactive device 10 to transmit data to another device, the combined functionality of the infrared receiver 22*a* and infrared transmitter 22*b* being in accordance with the teachings of U.S. Pat. No. 7,068,941 entitled Interactive Talking Dolls, the disclosure of which is incorporated herein by reference. In addition, in either embodiment the output means may be an audio or visual display, such as a display screen or the like. The input and output means are likely to vary in accordance with the design and functionality of the interactive device 10. In the present embodiment, in order to conform to the overall aesthetic design of the interactive device 10 it is advantageous to design the switches 16*a*, 16*b* and the internal speaker 18 to conform to the design of the teddy bear. Moreover, it is also contemplated that in accordance with a further alternative embodiment of the present invention, the interactive device 10 may be outfitted with a transmitter and receiver which allow for the transmission, reception and synchronization of data information through the use of radio frequency (RF) rather than through the use of infrared as occurs through the use of the infrared receiver 22*a* and the infrared transmitter 22*b*.

The user enters desired values into the programs 12*a*-12*c* by manipulating the input switches 16*a*, 16*b*. Accordingly, the internal speaker 18 emits correlating audible message that indicate the value the user has toggled through or selected. FIG. 3 depicts the data structure of the programs 12*a*-12*c* of the computer processor 12. The clock calendar program 12*a* generally comprises date 24 and time 26 fields. The date 24 and time 26 serve as the internal clock and calendar of the interactive device 10 and are adjustable at anytime. The clock calendar program 12*a* is preprogrammed to default to "January" in the month field 24*a*. Therefore, when setting the month, the internal speaker 18 generates the word "January" to indicate the value that is currently selected in that field 24*a*. The user may increment the month by pushing the 'ear' switch 16*b* and upon reaching the desired month, the user may set the month by pushing the 'paw' switch 16*a*. The day field 24*b* defaults to the first day of the month "01", and accordingly, the program generates a "first" via the internal speaker 18. The user may increment the value in the day field 24*b* by pushing the ear switch 16*b* and subsequently set the day by pushing the paw switch 16*a*. The year field is preprogrammed to default to the present year. By utilizing the input buttons 16*a*, 16*b* the user may toggle to and set the desired year.

The time fields 26 are set in a similar manner as the date fields 24. The time 26 is set to hour 26*a*, minute 26*b*, second 26*c* and AM/PM 26*d*. The user may adjust the date 24 or time 26 at anytime following the steps illustrated in the flowchart of FIG. 17 by toggling the input switches 16*a*, 16*b*. The user may set or enter the interactive device 10 into a "sleep" mode or power conservation mode, and yet still retain the values set in programs 12*b*-12*c*. The interactive device 10 may also automatically enter itself into the "sleep" mode or power conservation mode if it is not being activated or used for a certain period of time, and yet still retain the values set in programs 12*b*-12*c*. As time progresses, even in the power conservation mode, the clock and calendar values in program 12*a* will continue to be updated.

The daylight savings program 12*b* generally comprises a data structure that stores a summer solstice date 28 and a winter solstice date 30. The user may input values in the daylight savings program 12*b* by setting the date fields 28, 30 of the summer and winter solstices. The dates 28, 30 are set in a similar manner, as was the date in the clock calendar program 12*a* by manipulating the input switches 16*a* and 16*b*. Since daylight savings is not observed universally, the user may turn this functionality off if so desired. Selecting "00" in the month fields 28*a*, 30*a* and the day fields 28*b*, 30*b* disables the daylight savings functionality. In this regard, the daylight savings program 12*b* can come preprogrammed to default a particular month or day. However, the user may populate the fields to adjust the dates for different parts or areas of the world.

The daily alarm and announcements program 12*c* generally comprises a data structure that stores a function field 32 and setting fields 34*a*, 34*b*. The function field 32 stores particular alarms or announcement indicative of an event. The setting fields 34*a*, 34*b* store the date and time the function field 32 is activated. The function field 32 may or may not be open to being adjusted or altered depending on the specifics of the embodiment. However, manipulating the setting fields 34*a*, 34*b* may disable the functionality stored within the function field 32. In the present embodiment, the daily alarm and announcements program 12*c* comes preprogrammed with the functionality and correlating library of sounds relative to an Advent calendar such as the exemplary Advent calendar 1. Once the clock calendar program 12*a* has advanced and reached an anticipated date 34*a* and time 34*b* as prescribed by the daily alarm and announcements program 12*c*, the program will initiate the play of specific messages 32. In this regard, the interactive device 10 will speak or broadcast messages to communicate the anticipation of the holiday event at whatever time the daily alarm and announcements program 12*c* calls for. For example, upon a designated time 34*b* each day of December between December 1 and December 25, a response is generated from the daily alarm and announcements program counting down the days to Christmas, December 25.

Figures 14, 14A:
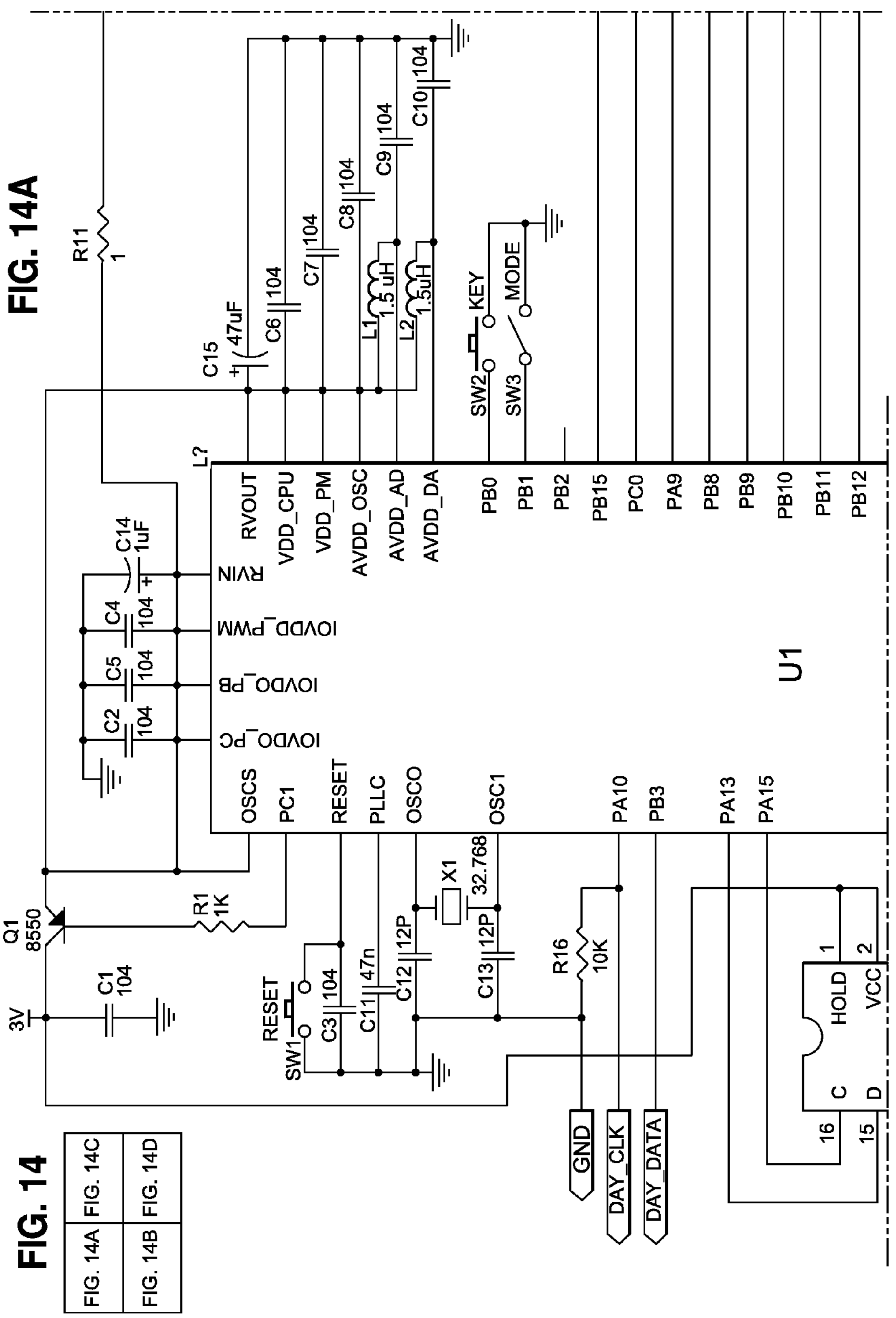
FIGS. 14A-14D depict the electrical schematics of yet another embodiment of the interactive device, which includes a rewritable memory integrated circuit.
Figure 14B:
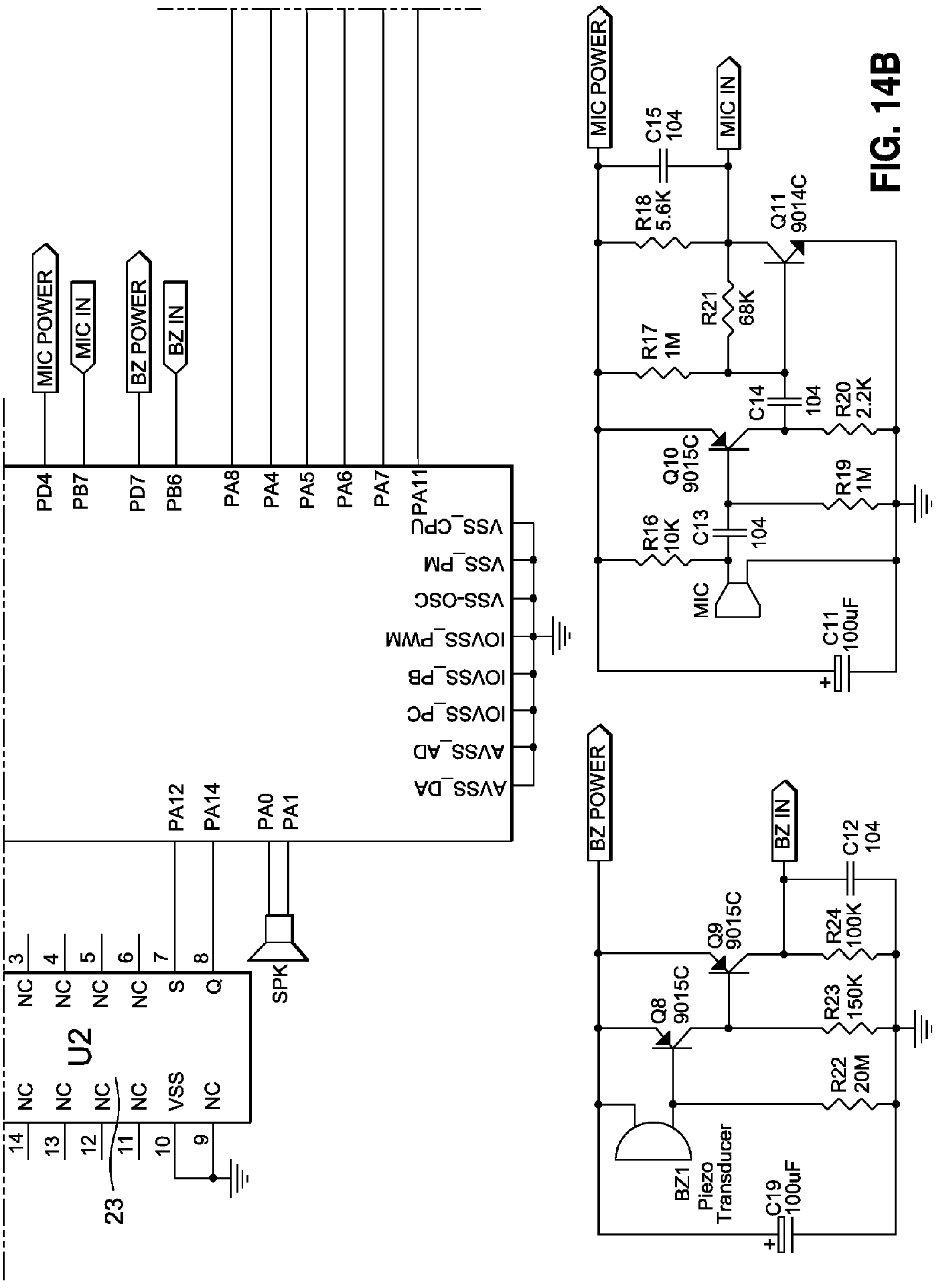
Figure 14C:
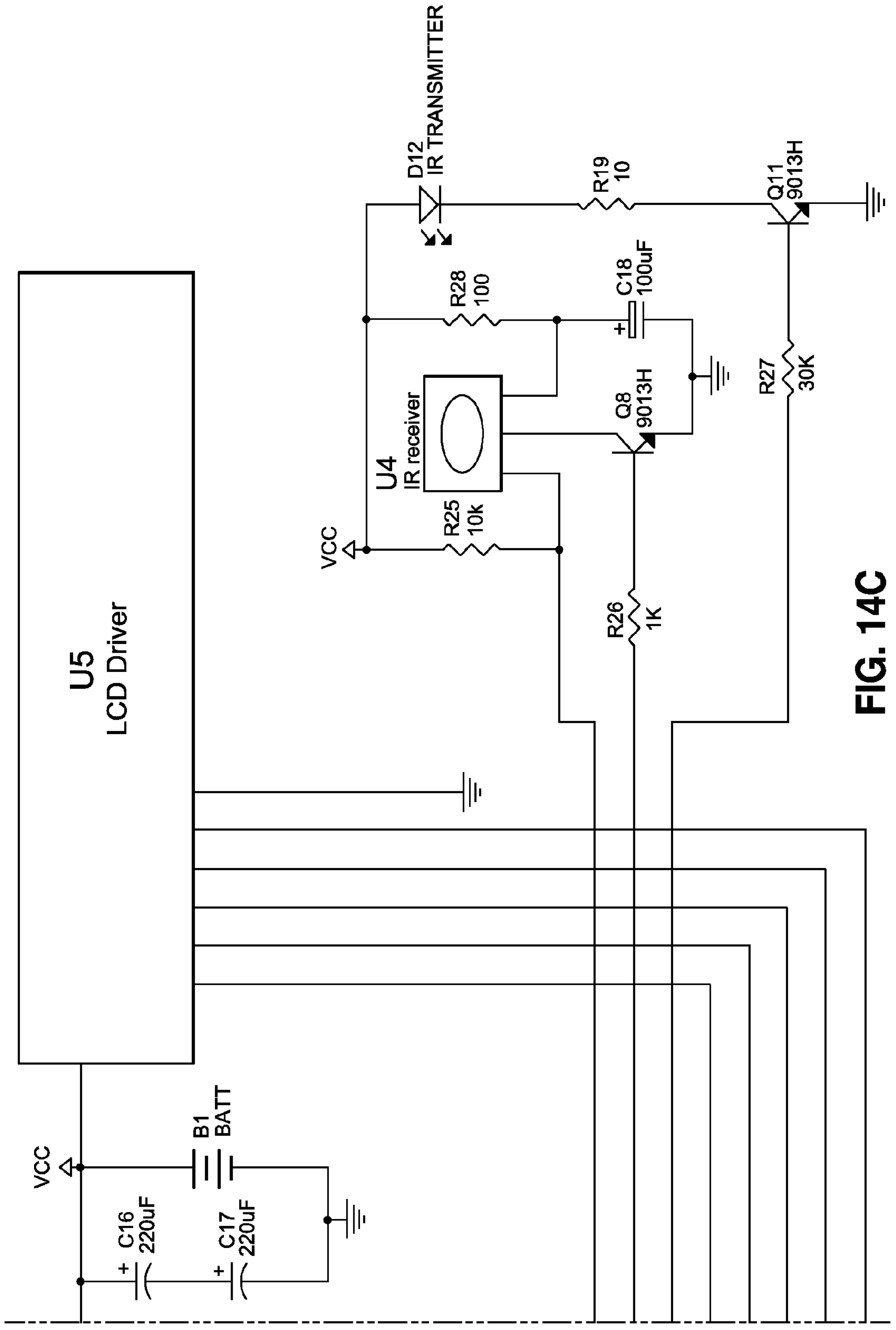
Figure 14D:
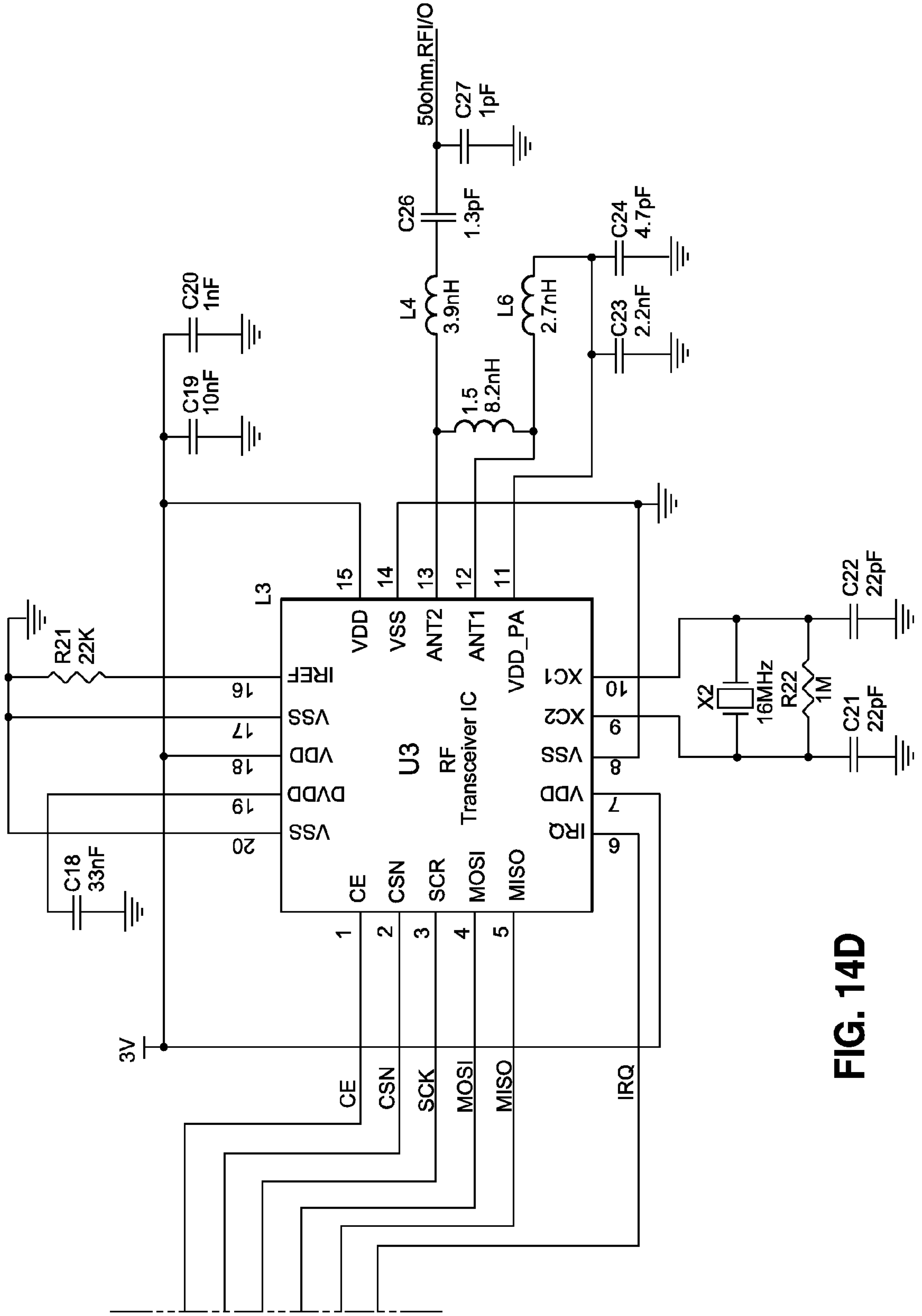

A person having ordinary skill in the art would understand that the daily alarm and announcements program 12*c* is capable of being programmed with a variety of functions 32 in anticipation of upcoming holidays or events. It is contemplated that in another embodiment of the present invention, functions 32 may be inputted to the interactive device 10 through software or by downloading content via the Internet. Additionally, the functions 32 and setting fields 34*a*, 34*b* may be updated or changed by another interactive device 10 through the synchronization process as will be described in further detail below. The manufacturer or third parties may provide functions 32 to store within the daily alarm and announcements program 12*c* during or after the manufacture of the interactive devices 10, or even after the interactive devices 10 have been shipped or purchased. One contemplated embodiment of an interactive device 10 best illustrated in FIG. 14 includes a re-writable memory module 23, on which the aforementioned updates to the daily alarm and announcements program 12*c* may be stored. Any type of memory device, such as Flash, may be utilized.

Referring back to FIG. 4, the interactive device 10 is strategically fitted with a motor 10*a* and a series of switches 10*b* and actuators that enable the interactive device 10 to mimic human action by turning its head and opening/closing its mouth, and flashing lights 10*c* in response to the daily alarm and announcements program 12*c*. The switches 10*b* are generally factory settable (or selectable). The physical actions of the interactive device 10 are specific such that they are activated according to a particular event. The internal speaker 18 emits messages while the mouth is moving, thereby giving the appearance that the interactive device 10 is directly speaking messages to the user. Consumers are generally drawn towards toys that mimic human actions. Therefore, the creativity of the interactive device 10 enhances the marketable appeal of the toy. Along these lines, retailers may find it advantageous to place interactive devices 10 upon the same shelf such that they generate a response in unison. The appearance of numerous interactive devices 10 simultaneously generating visual and audio stimulation further lends to marketable appeal. It should be noted that the switch SW6 shown in FIGS. 4 and 5 is a selection switch only needed by the manufacturer of the interactive device 10, such switch SW6 normally being open and optionally used by the manufacturer to assess the accuracy of the internal clock of the interactive device 10, based upon a reading or announcement of the current time including the hour, minute, and second.

In another embodiment of the present invention, multiple interactive devices 10 may come preprogrammed and time synchronized by the manufacturer such that the clock and calendar program 12*a* of each interactive device 10 may run at exactly the same date 24 and the same time 26. This results in the interactive devices 10 being capable of generating responses in unison. The manufacturer programs the interactive device 10 by utilizing a setup module 20, as illustrated in FIGS. 2, 6-8. The setup module 20 is an operative device that is communicable with the interactive device 10. The setup module 20 programs the interactive device 10 by inputting parameters into the clock calendar program 12*a*, the daylight savings program 12*b*, and the daily alarm and announcements program 12*c*. In addition, the setup module 20 synchronizes the date 24 and time 26 of multiple interactive devices 10 such that each interactive device 10 may run at exactly the same date 24 and the same time 26. Therefore, the interactive devices 10 will activate any functions 32 stored in the daily alarm and announcements program 12*c* in unison.

Figure 6:
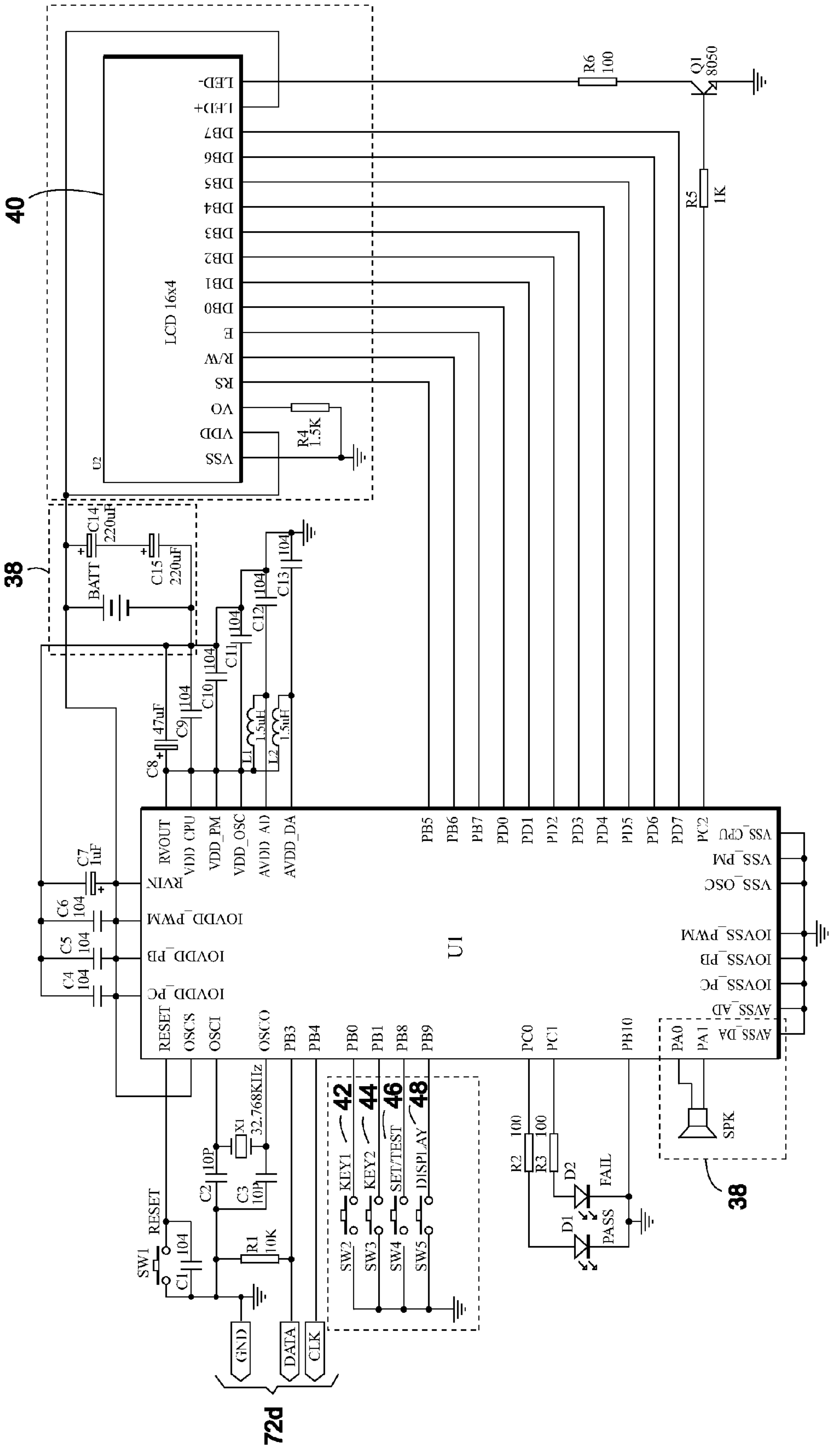
FIG. 6 depicts the electrical schematics of an exemplary setup module which may be used in conjunction with the interactive device of the present invention.

Referring now to FIGS. 2 and 6, the setup module 20 comprises a computer processor 36, an internal battery 38, an electronic display screen 40, a connection means, an input means, and an internal speaker 50 or another acoustic transducer device. Although the present embodiment employs a setup module 20 that is a hardware component, the functionality of the setup module 20 may also be embodied as software, provided that the device (e.g., a personal computer) running such software is capable of being connected to the interactive device 10 in a manner which will be discussed in more detail below.

Figure 7:
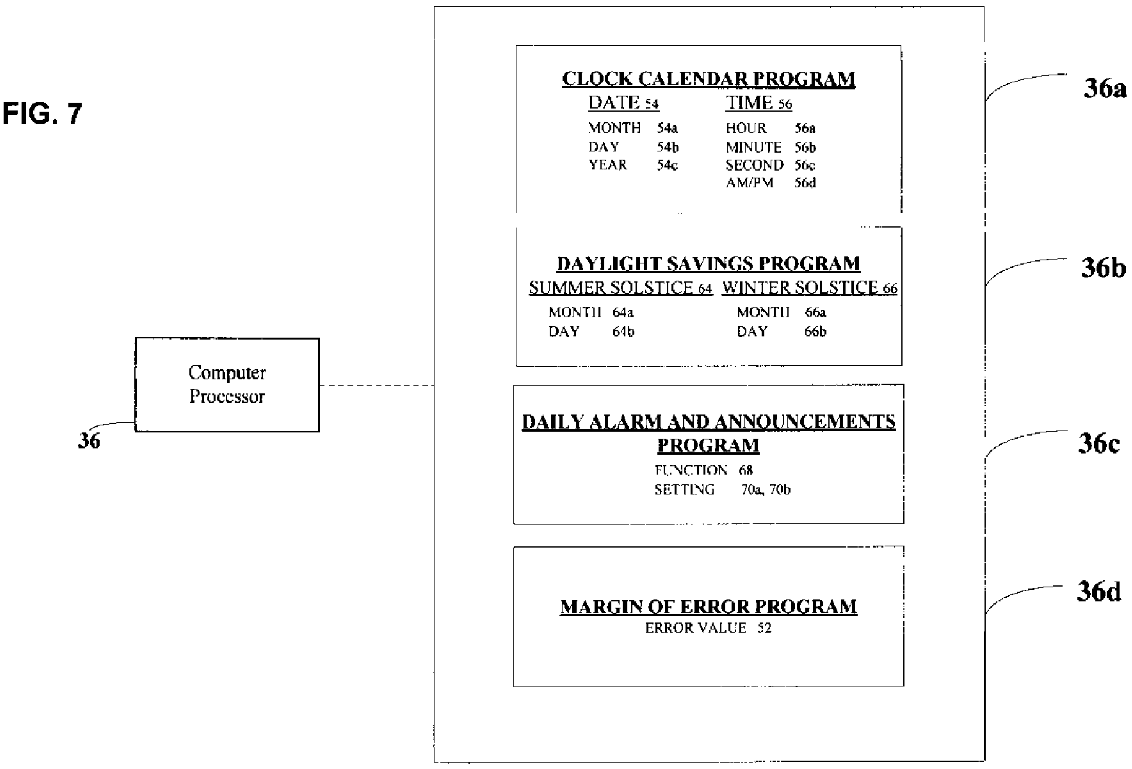
FIG. 7 depicts a software architecture block diagram, representing the data structures of each program run in an embodiment of the setup module.
Figure 8:
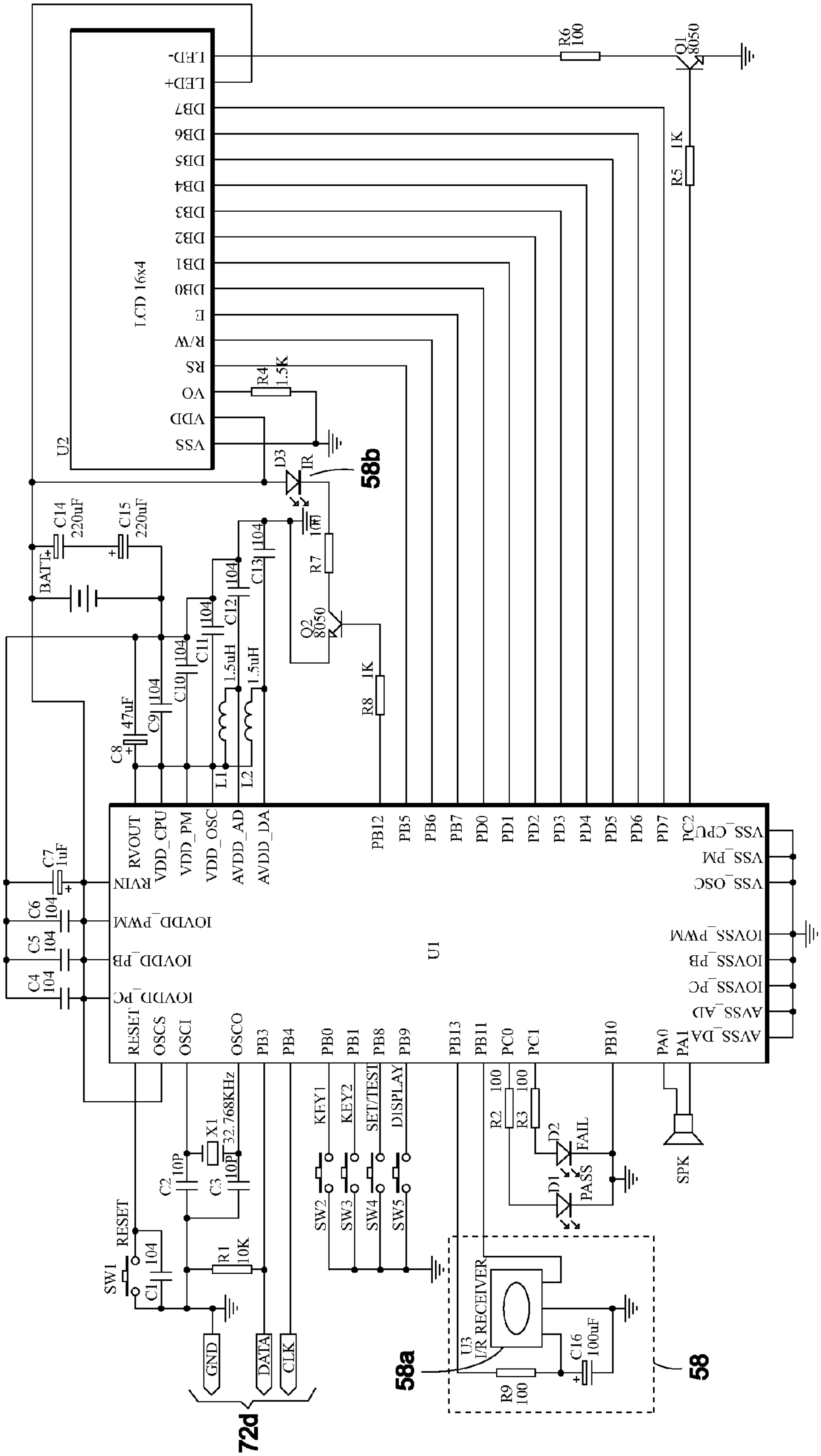
FIG. 8 depicts the electrical schematics of another embodiment of the setup module, wherein the setup module is equipped with an infrared receiver from which to receive data.
Figure 9:
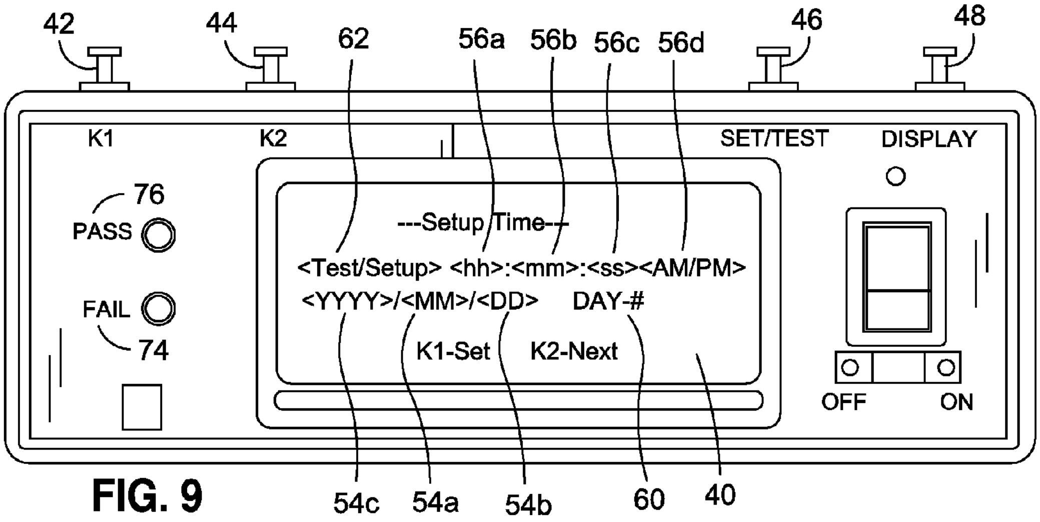
FIG. 9 depicts a screenshot of the setup module, as shown in FIG. 2, while the clock calendar program is in setup mode.

The computer processor 36 runs a series of programs that load the interactive devices 10 with requisite values and parameters. FIG. 7 depicts a software architecture block diagram illustrating the relationship between the setup module's programs. The computer processor 36 runs a clock calendar program 36*a*, a daylight savings program 36*b*, a daily alarm and announcements program 36*c*, and a margin of error program 36*d*. In this regard, the clock calendar program 36*a*, daylight savings program 36*b*, and daily alarm and announcements program 36*c* carry the same logic and data structure as do their counterpart programs 12*a*-12*c* that run in the interactive device 10. The margin of error program 36*d* stores a measurement of time 52 that serves as an acceptable deviation between the time 26 of the interactive device 10 and the time 56 of the setup module 20. The input means of the setup module 20 may comprise various buttons 42, 44, 46, 48 to input data. The input buttons 42, 44, 46, 48 are disposed upon the setup module 20. In an exemplary embodiment of the present invention, data may be inputted into the setup module 20 through wireless technology. In this regard, FIG. 8 illustrates the schematics of a setup module 20 configured with an infrared receiver 58*a* as an input means. It is contemplated that a person having ordinary skill in the art would understand that, in this particular embodiment, a user may input data into the setup module 20 by operating a device which has infrared transmission capability. It is also contemplated that in this alternative embodiment, the setup module 20 may be provided with an infrared transmitter 58*b* that allows the setup module 20 to transmit data to an interactive device 10, the combined functionality of the infrared receiver 58*a* and infrared transmitter 58*b* also being in accordance with the teachings of U.S. Pat. No. 7,068,941 mentioned above. Moreover, it is also contemplated that in accordance with a further alternative embodiment of the present invention, the setup module 20 may be outfitted with a transmitter and receiver which allow for the transmission, reception and synchronization of data information through the use of radio frequency (RF) rather than through the use of infrared as occurs through the use of the infrared receiver 58*a* and the infrared transmitter 58*b*.

The setup module 20 has a setup configuration mode and a test configuration mode. The setup configuration mode permits desired values to be entered into the programs 36*a*-36*d*. FIGS. 9-12 illustrate screen shots of the display screen 40 while the setup module 20 is in a setup configuration mode and entering data into each program 36*a*-36*d*. The display button 48 toggles between the displays of different programs. The [K2] button 44 selects a target program 36*a*-36*d*, while the [K1] button 42 is depressed repeatedly until the correct data is displayed on the display screen 40 and then the [K2] button 44 is depressed again for confirmation and input of data into respective programs and fields.

The calendar clock program 36*a* is capable of carrying out the functions of a traditional clock and calendar, in that it may record date 54 and time 56. The values inputted as the date 54 and time 56, will subsequently be the values stored in the interactive device 10 as date 24 and time 26. The date 54 and time 56 fields of the calendar clock program 36*a* of the setup module 20 are displayed upon the display screen 40. The date fields 54 include a year field 54*c* (<YYYY>), a month field 54*a* (<MM>), a day field 54*b* (<DD>), a day/number field 60 (<DAY-#>), a Test/Setup field 62 (<Test/Setup>). The time fields 56 include an hour field 56*a* (<hh>), a minute field 56*b* (<mm>), a second field 56*c* (<ss>), and an AM/PM field 56*d* (<AM/PM>).

Parameters are inputted into a respective field when a cursor is flashing on that particular field. In this regard, in order to program the year field 54*c*, the year field 54*c* must be flashing. The year can be incremented to future years by pushing the [K1] button 42. Upon toggling to a desired year, the manufacturer can store the year by pushing the [K2] button 44. Likewise, in order to input a month value, the month field 54*a* must be flashing. The month field 54*a* can be incremented to future months by pushing the [K1] button 42. Upon reaching a desired month, the manufacturer can store the month by pushing [K2] button 44. For example, if the desired month is March, the manufacturer would push the [K1] button 42 twice, upon doing so, "03" would be flashing in the month field. Subsequently, the manufacturer would push [K2] button 44 to set the month as March. In order to input values into the day field 54*b*, the day field 54*b* must be flashing. The day field 54*b* can be incremented by pushing the [K1] button 42. Upon reaching a desired day, the manufacturer can store the day by pushing the [K2] button 44.

The day/number field 60 is populated with the day of the week and the correlated day number of that week. In this regard, table 1 lists the days of the week and the corresponding day number:

TABLE 1

| Day of the week | Day Number |
|---|---|
| Monday | 1 |
| Tuesday | 2 |
| Wednesday | 3 |
| Thursday | 4 |
| Friday | 5 |
| Saturday | 6 |
| Sunday | 7 |

As the month 54*a*, day 54*b*, or year 54*c* fields are adjusted, the corresponding day of the week and day number is displayed in the day/number field 60.

The time fields 56 are set in a similar manner, as are the date fields 54. The time fields 56 include an hour field 56*a*, a minute field 56*b*, a second field 56*c*, and an AM/PM field 56*d*. Each respective field 56*a*-56*d* must be flashing in order to input data. The values may be incremented by pushing the [K1] button 42 and stored in the program by pushing the [K2] button 44. The Test/Setup field 62 is used as a moniker to distinguish whether the setup module 20 is in the setup configuration or the test configuration. In the test configuration, the setup module 20 can test to ensure that the settings of the interactive device 10 are in accordance to those of the setup module 20. The testing configuration's functionality is described in detail below. The user may toggle between the configurations by pushing the [K1] 42 button and subsequently set the configuration by pushing the [K2] 44 button.

Figure 10A:
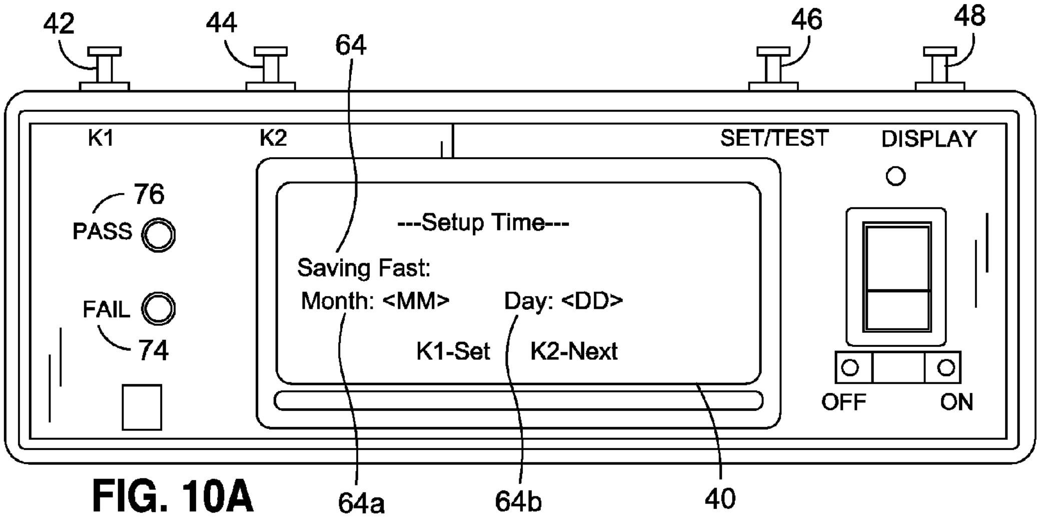
FIG. 10A depicts a screenshot of the setup module, as shown in FIG. 2, while the daylight savings program is in setup mode and the summer solstice date may be inputted.
Figure 10B:
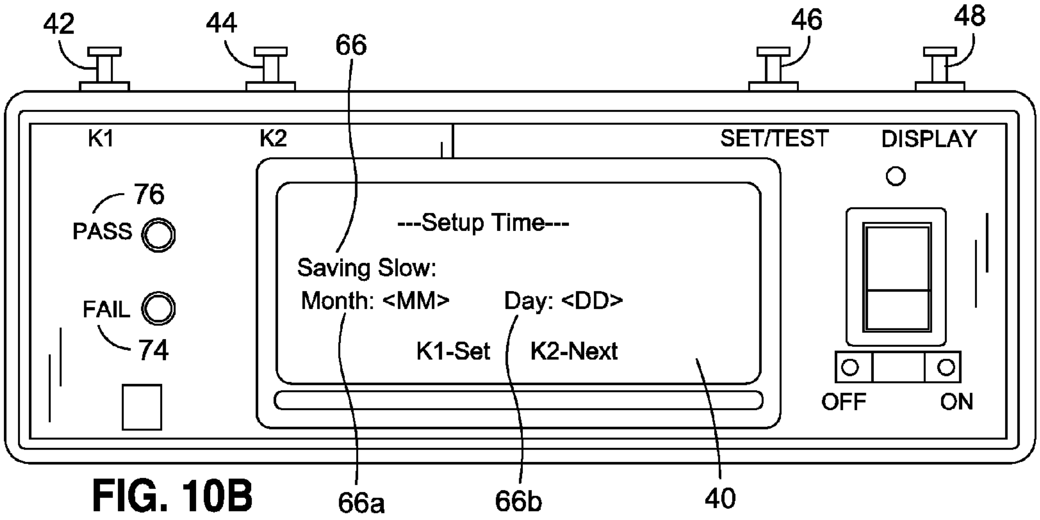
FIG. 10B depicts a screenshot of the setup module, as shown in FIG. 2, while the daylight savings program is in setup mode and the winter solstice date may be inputted.

FIGS. 10A and 10B illustrate screen shots of the display screen 40 while the daylight savings program 36*b* is in setup mode. The setup modes provides for a month field 64*a*, 66*a* and a day field 64*b*, 66*b* in which the user may input the date of the summer solstice and winter solstice. If the interactive device 10 is being shipped to a location that does not acknowledge daylight savings, a "00" may be entered in the month field 64*a*, 66*a* and day field 64*b*, 66*b*. More specifically, FIG. 10A illustrates a screen shot of the display screen 40 depicting the daylight savings program 36*b* receiving data in anticipation of the summer solstice, where time is pushed forward by one hour. The setup module 20 allows the user to enter the date 64 of the summer solstice into the month field 64*a* and day field 64*b*, to trigger the functionality of time being pushed forward by one hour on that day. Manipulating the [K1] 42 and [K2] 44 buttons sets the date 64. In the present embodiment, the display screen 40 reads "Saving Fast" as indicative of the summer solstice.

FIG. 10B illustrates a screen shot of the display screen 40 depicting the daylight savings program 36*b* receiving data in anticipation of the winter solstice, where time is pushed back by one hour. The setup module 20 allows the user to enter the date 66 of the winter solstice into the month field 66*a* and day field 66*b*. On that particular date 66, the program 36*b* sets the time of the clock calendar program 36*a* one hour backward. The manipulation of the [K1] 42 and [K2] 44 buttons sets the date 66. In the present embodiment, the display screen 40 reads "Saving Slow" as indicative of the winter solstice. However, it is understood that any moniker may distinctly be representative of the summer and winter solstices.

Figure 11A:
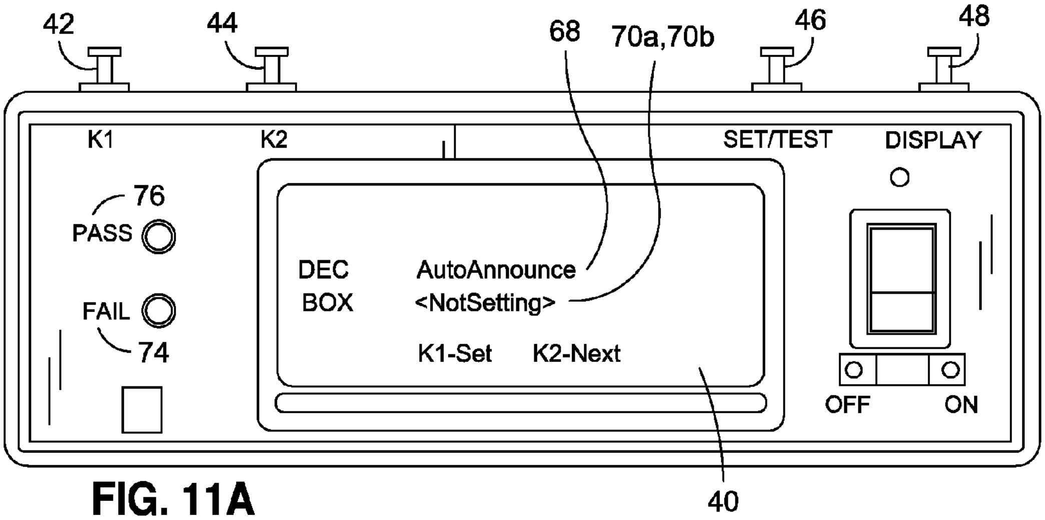
FIG. 11A depicts a screenshot of the setup module, as shown in FIG. 2, while the daily alarm and announcements program is in setup mode and the functionality is disabled.
Figure 11B:
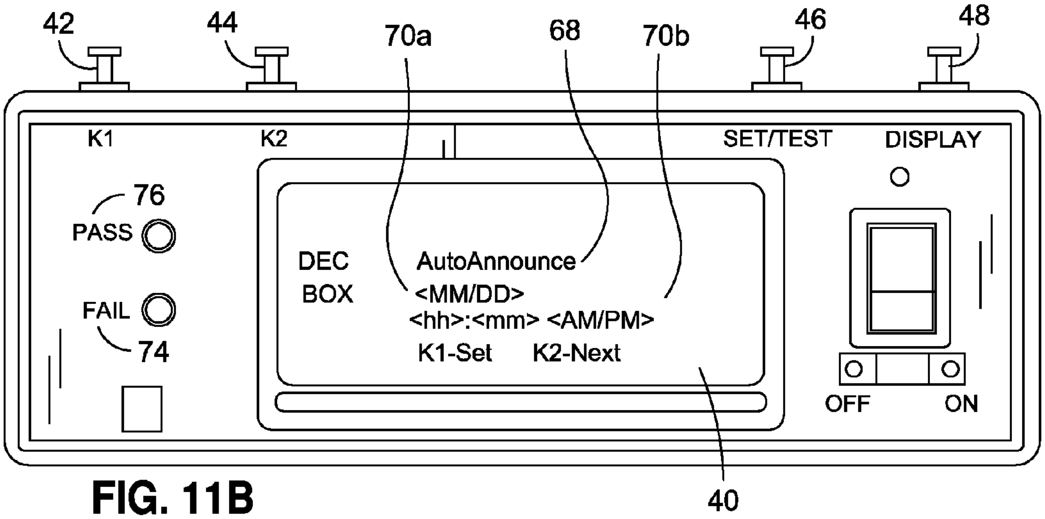
FIG. 11B depicts a screenshot of the setup module, as shown in FIG. 2, while the daily alarm and announcements program is in setup mode and the functionality is enabled and is set according to a setting date.

FIGS. 11A and 11B illustrate screen shots of the display screen 40 while the daily alarm and announcements program 36*c* is in setup mode. The daily alarm and announcements program 36*c* allows a manufacturer to store particular occasions on which to trigger an alarm and announcement. Interactive devices 10 come preprogrammed by the manufacturer with a library or responses that correlate to the stored alarms and are triggered by the program on the appropriate day and/or the appropriate time in anticipation thereof.

The daily alarm and announcements program 36*c* has a function field 68 and setting fields 70*a*, 70*b*. The function field 68 is representative of a particular response on an occasion. In the present embodiment, the function field 68 is set to "DEC AutoAnnounce", this particular function represents the logic of an Advent calendar like the Advent calendar 1 and automatically generates a December greeting at a prescribed date indicated by setting field 70*a* and a prescribed time indicated by the setting field 70*b*. If the user does not want a particular function to be active in an interactive device, the setting fields 70*a*, 70*b* can be populated with "NotSetting", as illustrated in FIG. 11A. Otherwise, the setting fields 70*a*, 70*b* may be populated with the date and time representative of when the function should be triggered, as illustrated in FIG. 11B. A person having ordinary skill in the art would understand that the daily alarm and announcements program 36*c* may store a multitude of response functions 68 that can be performed on multiple dates 70*a* and different times 70*b*.

Figure 12:
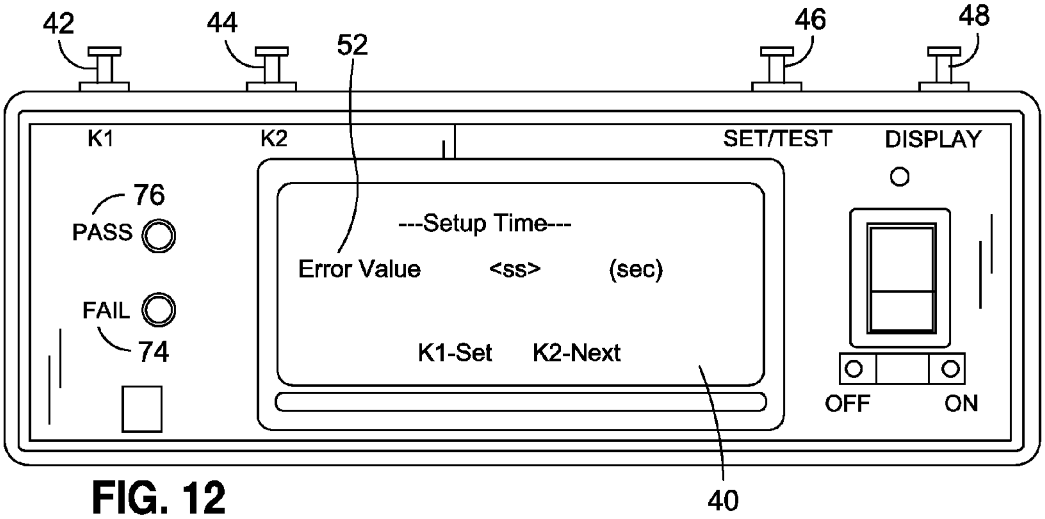
FIG. 12 depicts a screenshot of the setup module, as shown in FIG. 2, while the margin of error program is in setup mode.

FIG. 12 illustrates a screen shot of the display screen 40 while the margin of error program 36*d* is in a setup configuration. The margin of error program 36*d* has an Error Value field 52. The Error Value field 52 stores a measurement of time that represents an acceptable deviation between the time 56 of the setup module 20 and the time 26 of the interactive devices 10. Oftentimes it is difficult to time synchronize devices within fractions of a second. It is normal practice for two time synchronized devices to have an acceptable deviation in time. Therefore, manufacturers allot a particular measurement of time that is considered an acceptable deviation. It is generally preferred that the deviation in time be minute such that the consumers will not be cognizant of the time deviation. In the present embodiment, the Error Value field 52 is measured by seconds. Therefore, if the Error Value field 52 were set at '2', the setup module 20 would accept a two second deviation between the time 56 set in the setup module 20 and the time 26 set in the interactive device 10.

The setup module 20 programs and time synchronizes an interactive device 10 through a connection. A connection is established via the connection means. FIG. 2 illustrates the setup module 20 as being connected to an interactive device 10 by employing a hard wire or cable 72*a* as the connection means. The cable 72*a* is coupled into a jack 72*b* that is embedded within the interactive device 10 by a three-prong connector 72*c* that is coupled to the distal end of the cable 72*a*. The three prongs of the connector 72*c* correspond to the three input/output ports collectively labeled with the reference number 72*d* in FIGS. 6 and 8. The jack 72*b* is strategically placed in a discreet manner as to not compromise the aesthetic design of the interactive device 10. As indicated above, FIGS. 5 and 8 illustrate an embodiment of the present invention where the setup module 20 and the interactive device 10 can be communicable via infrared technology 22*a*, 22*b*, 58*a*, 58*b* as an alternative to the use of the cable 72*a*. In this particular variant, it is contemplated that the jack 72*b* may be substituted with an infrared transceiver which may communicate with a corresponding infrared transceiver of the setup module 20. As also indicated above, the functionality of the setup module 20 may also be embodied as software, provided that the device (e.g., a personal computer) running such software is capable of being connected to the jack 72*b* of the interactive device 10. Such connection may be facilitated by cable like the cable 72*a* which has the connector 72*c* at one end thereof and a USB connector connectable to a USB port of the personal computer at the other end thereof. Also, in this particular variant, the jack 72*b* embedded in the interactive device 10 can be substituted or replaced with a USB-port jack for connection with a standard USB-port cable.

An established connection enables the setup module 20 to program and test the interactive device 10. The setup module 20 programs the interactive device 10 by setting the values in the clock calendar program 12*a*, daylight savings program 12*b*, and daily alarm and announcements program 12*c*. The SET/TEST button 46 initiates the data transfer.

Figure 19:
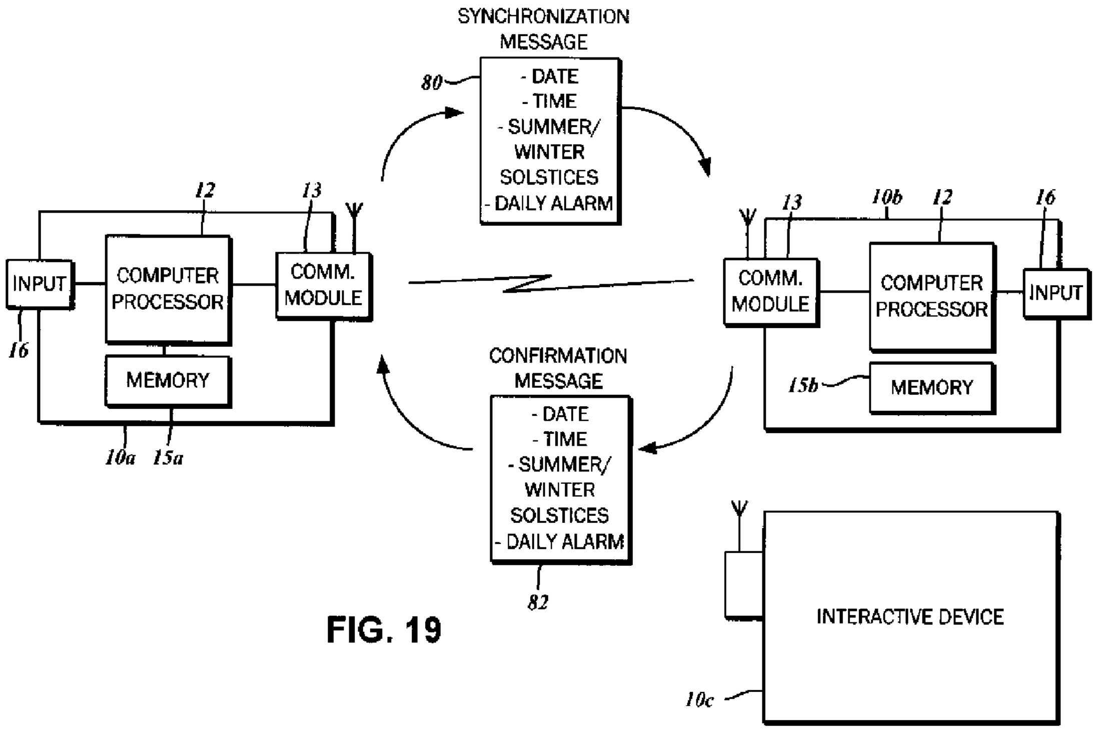
FIG. 19 is a block diagram showing the exemplary components of time-synchronized interactive devices in the local area.

As was just discussed in detail, the foregoing embodiments of the present invention generally contemplate the synchronization of multiple interactive devices 10 with the setup module 20. It is also contemplated, however, that the time synchronization can be performed amongst the several interactive devices 10 without connecting to the setup module 20. It will be appreciated that due to slight differences in clock frequencies of the computer processor 12 illustrated in FIG. 19, the internal clocks of different interactive devices 10 may deviate from each other. Therefore, it may be suitable and appropriate to re-synchronize the same after the interactive devices 10 are deployed in the field. As will be appreciated by those having ordinary skill in the art, maintaining the synchronized state of the interactive devices 10 after deployment finds utility in numerous contexts and embodiments of the present invention.

In one contemplated embodiment involving the aforementioned talking dolls set forth in U.S. Pat. No. 7,068,941, there may be time-sensitive spoken dialogue in which an accurate statement depends upon the correct time being set therein. For example, one doll may ask the other doll what its favorite TV show is. The queried doll may announce a particular show along with some laudatory comments regarding the same, as well as the time it airs (e.g., "7:00 o'clock"). The querying doll may then respond with the remaining amount of time before the show is aired (e.g., "That's in 15 minutes" where the current actual time is 6:45). As another example, upon being activated at, for example, 10 o'clock in the morning on a Sunday, the doll may generate a spoken message such as "I'm hungry, let's go to brunch." In addition to the talking doll devices, however, the local area time synchronization features may be utilized in other devices in which time-sensitive messages can be generated upon user activation.

In another contemplated embodiment, the method and system detailed further below may be employed in various electronic devices such as digital cameras, digital video recorders, and the like that are commonly found within a local area of a particular house or dwelling unit, as such devices may benefit from having a synchronized time. In order to circumvent the time-consuming procedure of setting the time of these devices, a single device may receive an updated clock value, which may then be propagated to the local devices.

Figure 18:
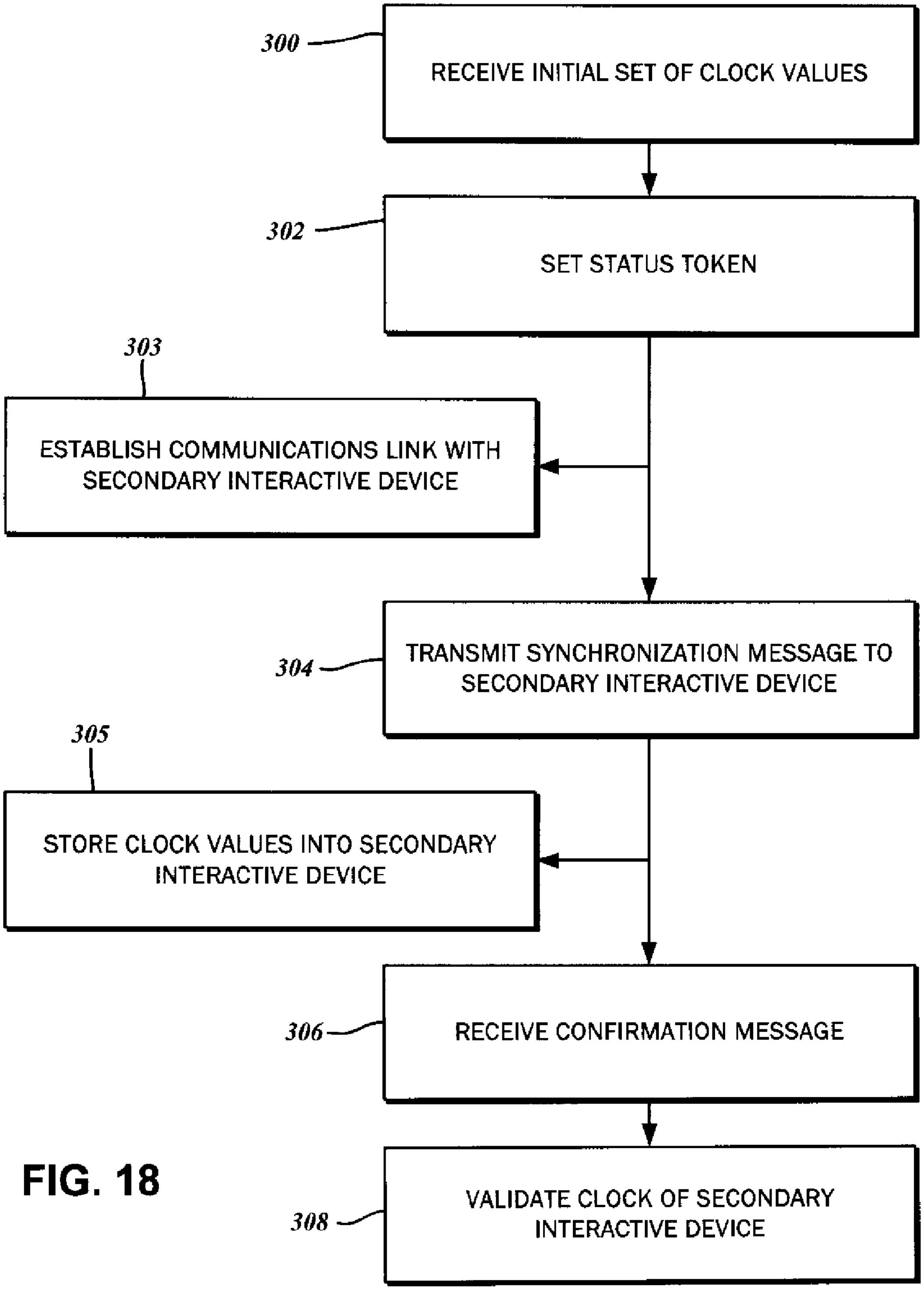
FIG. 18 is a flowchart illustrating a sequence of steps for a method for synchronizing interactive devices in a local area.

The flowchart of FIG. 18 illustrates one embodiment of a method for synchronizing the clocks of a plurality of interactive devices 10. Referring also to the block diagram of FIG. 19, specific features of the interactive device 10 having this functionality will be considered. This embodiment of the interactive device 10 includes the input device 16, with which an initial set of clock values is received according to step 300. The initial set of clock values, as referenced herein, is understood to refer to the clock values that are actively updated and maintained based upon those set by the manufacturer and are subsequently confirmed to be accurate by the user, as well as newly entered clock values by the user. As indicated above and further elaborated upon below, the input device 16 may be a switch, a button, or the like, and be used to key in data to the clock calendar program 12*a*, the daylight savings program 12*b*, and the daily alarm and announcements program 12*c*. It is also possible for multiple input devices 16, including a plurality of the switches and buttons to be incorporated. Specifically, the date 24, the time 26, the summer solstice date 28, the winter solstice date 30, and data for the function field 32 and setting fields 34*a*, 34*b* may be provided to the computer processor 12 via the input device 16 in the manner discussed above. Once input, this initial set of clock values is stored in a memory 15*a* connected to the computer processor 12 for use by the computer programs.

Upon receiving the initial set of clock values, the method continues with a step 302 of setting a status token. The interactive device 10 that receives the most recent updates to, or the most recent confirmation of accuracy by the user of, the clock values is designated as a primary interactive device 10*a*, and it is from here that updates are propagated to secondary interactive devices 10*b*, 10*c*. The status token effectively designates the respective primary or secondary statuses to each of the interactive devices 10 in a local area. The status token on a given interactive device 10 is set when it receives an update to the clock values as described above, or when the user confirms that the announced time and date is accurate or correct as detailed more fully below with reference to FIG. 17. The status token is contemplated to include a timestamp of when the update was received or when the clock values were confirmed. Furthermore, the primary interactive device 10*a* with the status token set has the permissions to update the clock values of the secondary interactive devices 10*b*, 10*c*. Although a specific implementation of channel access priority in relation to the different interactive devices 10 in the vicinity has been described it will be appreciated by those having ordinary skill in the art that other forms are possible.

Independent of setting the status token, the method may include a step 303 of establishing a communications link with the secondary interactive devices 10*b*, 10*c*. In this regard, the interactive devices 10 include a communications module 13 that is connected to the computer processor 12. In one embodiment, the communications module 13 is an infrared transceiver, while in another, it is a radio frequency (RF) transceiver. Any one of several well-known wireless data transfer modalities such as 2.4 GHz band RF, WiFi, Bluetooth, and the like may be substituted without departing from the scope of the present disclosure. Additionally, wired data transfer modalities may also be utilized. The specific procedures of establishing and maintaining the communications link such as handshaking and keeping alive will depend on the requirements of these different modalities.

While the foregoing example shows the communications link to just one secondary interactive device 10*b*, it will be appreciated that there may be another simultaneous communications link to the other secondary interactive device 10*c*. The bandwidth of the particular wireless data transfer modalities is the only limiting factor with respect to the quantity of other secondary interactive devices 10 with which the primary interactive device 10*a* can communicate.

Each of the interactive devices 10 initially communicate with each other to determine which one has the most updated or most recently confirmed clock values, this process concluding with the setting of the aforementioned status token on the primary interactive device 10*a*. In this regard, updates and confirmation of the accuracy of the clock values may be made earlier, and when the interactive devices 10 are brought in close proximity to each other, that is, within the local area, the handshaking procedure amongst them begins. In a typical case, the interactive devices 10 are in the "sleep mode," and once brought into proximity to each other, can be woken up by way of input/activation, then initiating the handshaking procedure. Additional modalities for waking up the interactive devices 10 are also contemplated in addition to the input/activation. Updating or confirming the accuracy of the clock values of one of the interactive devices 10 when there are others awakened in the local area are also understood to initiate the synchronization/update process.

With the status token set, the method continues with a step 304 of transmitting a synchronization message 80 to the secondary interactive device 10*b*. The synchronization message 80 is understood to include the date 24, the time 26, the summer solstice date 28, the winter solstice date 30, and data for the function field 32 and setting fields 34*a*, 34*b* as stored in the memory 15*a* and maintained by the respective subprograms of the software program.

The communications module 13 of the secondary interactive device 10*b* receives the synchronization message 80. In accordance with a step 305, the method includes storing the received synchronization message into a corresponding memory 15*b* of the secondary interactive device 10*b*. Thereafter, the method contemplates confirming the synchronization of the clocks, as will be set forth in greater detail below.

Figure 13A:
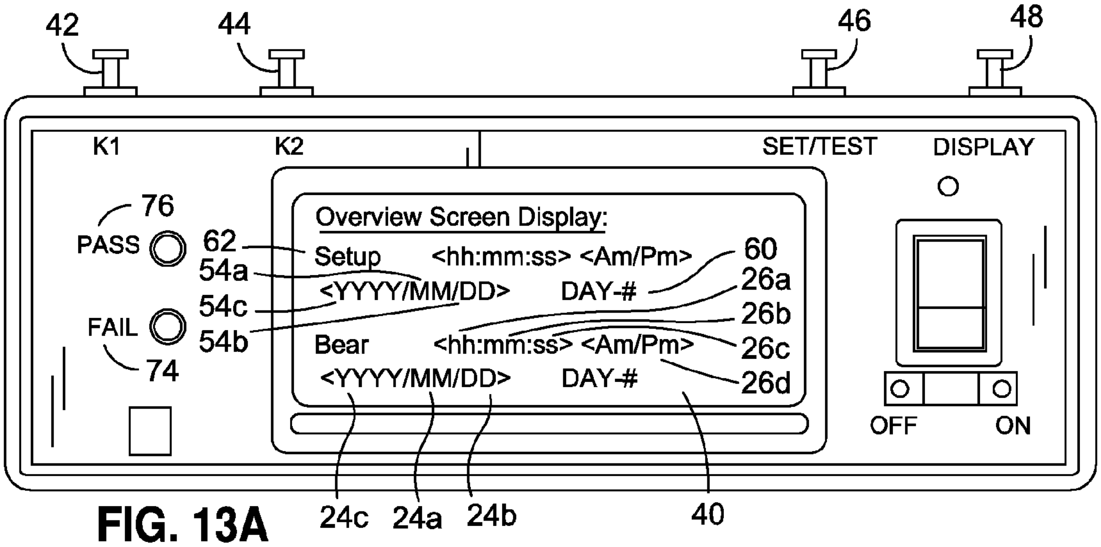
FIGS. 13A-13C depict screen shots of the setup module, while the setup module is connected to an interactive device, and the values inputted in each are displayed on the display screen.
Figure 13B:
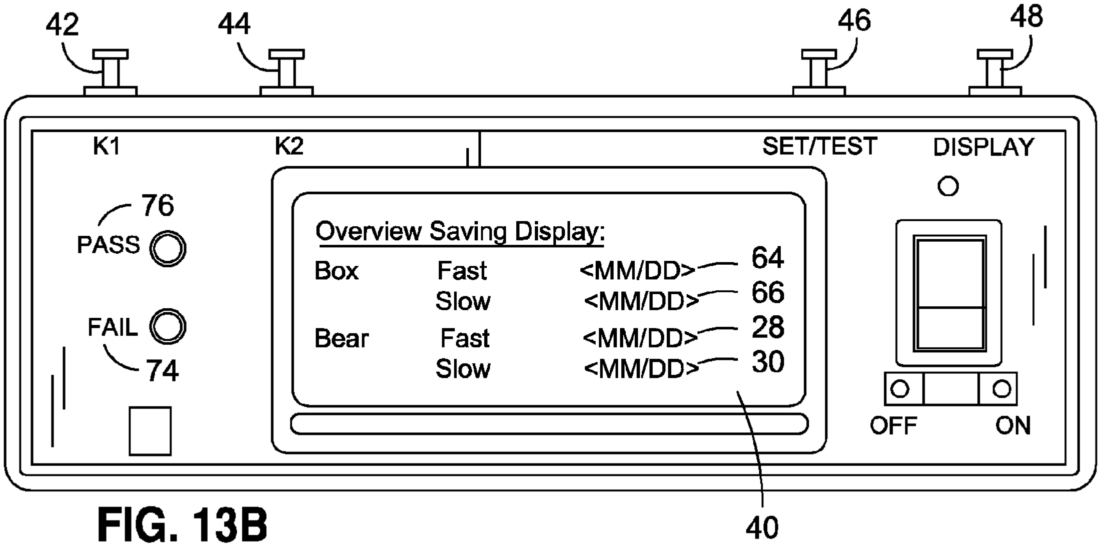
Figure 13C:
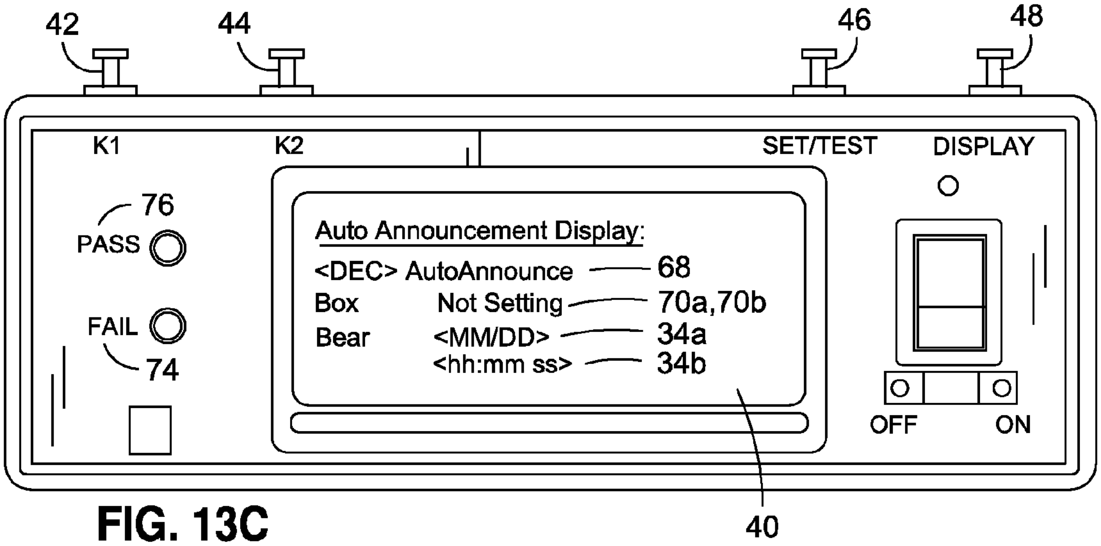

Returning to the embodiment of the present invention that utilizes the setup module 20, it is also understood to include a testing capability by which it ensures that the values stored in the interactive device 10 are in accordance to those set in the setup module 20. FIGS. 13A-13C depict screen shots of the setup module 20 in a testing configuration. More specifically, the display screen 40 is depicting the values entered in the programs 36*a*-36*c* of the setup module 20 set against the values of programs 12*a*-12*c* of the interactive device 10. The display button 48 toggles between each program. The manufacturer may visually check that each parameter is in accordance with the desired policy, or the manufacturer may trigger the automated testing function of a setup module 20 by pushing the SET/TEST button 46.

Figure 15:
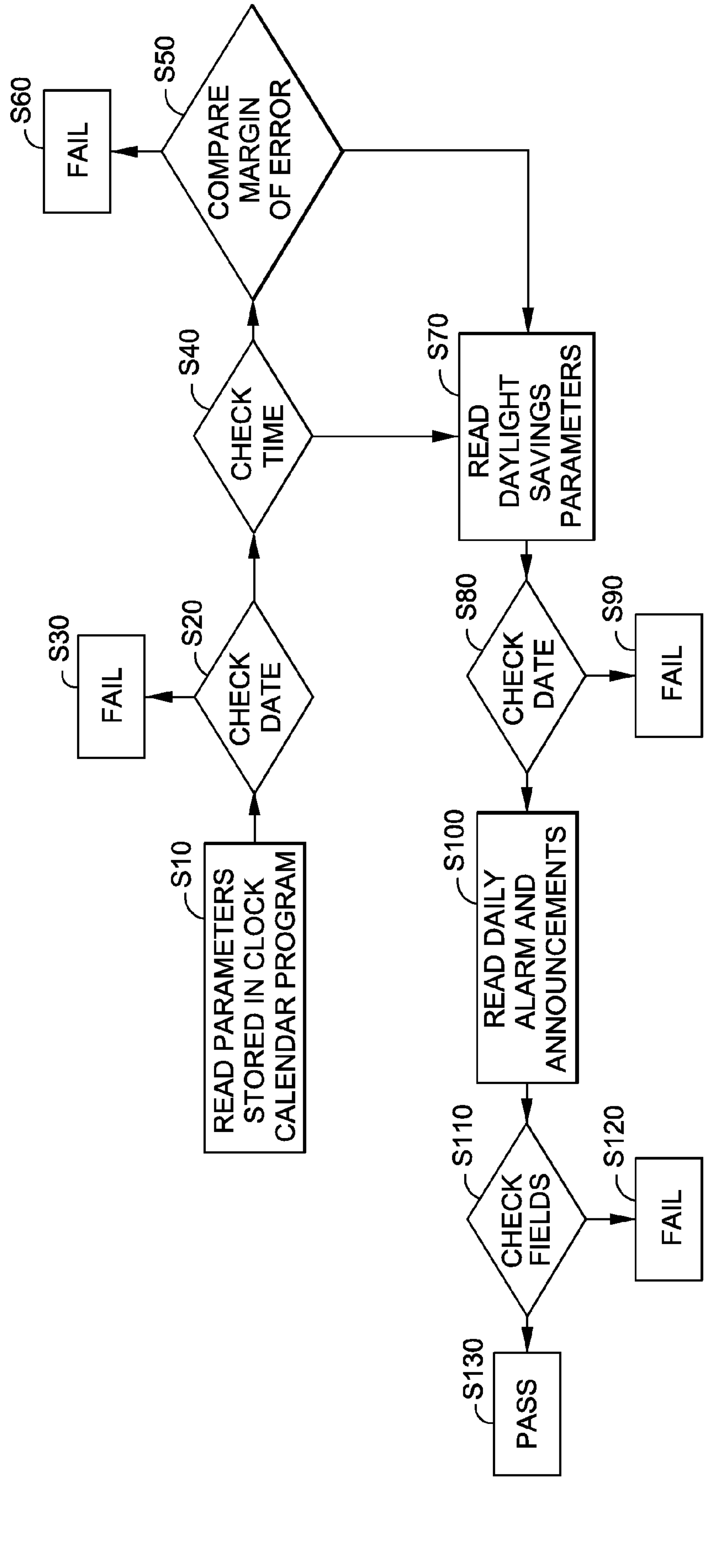
FIG. 15 illustrates a flowchart depicting a series of interactions that occur between an interactive device and a setup module, while the setup module is testing that the values stored in the interactive device are in accordance with the setup policy and parameters.

FIG. 15 is a flowchart depicting the testing logic employed by the setup module 20 in an automated testing configuration. At S10, the setup module 20 initially reads the date 24 and time 26 as set in the clock calendar program 12*a* of the interactive device 10. Subsequently at S20, the setup module 20 assess whether the date 24 matches the date field 54 as set in the setup module 20. If the date 24 is not in accordance with the date field 54 of the setup module 20, the setup module 20 will generate a FAIL message, indicated at step S30. When a FAIL message is triggered, the display screen 40 highlights the incorrect value, and illuminates a red light 74 on the setup module 20. In addition, the setup module 20 generates an audible alarm alerting the manufacturer that a FAIL message has been triggered. If the date 24 is in accordance, the setup module 20 will continue S40 to check the time 26 of the interactive device 10 with the time 56 stored in the setup module 20. If the times 26, 56 are not in accordance, the process continues S50 by deducing the difference in times with the value as set in the margin of error value field 52. If the difference in time is not an acceptable deviation as set forth in the setup module 20, a FAIL message will generate, as indicated at S60. If, however, times 26, 56 are in accordance, S50 is skipped, and the process continues with S70.

However, if the deviation in time is acceptable, the process continues S70 by reading the dates 28, 30 set in the daylight savings program 12*b* of the interactive device 10. The process continues S80 by checking the summer and winter solstice dates 28, 30 against the relative dates 64, 66 as set in the setup module 20. In this regard, if the summer and winter solstice dates 28, 30 are not in accordance with the respective dates 64, 66 as set in the setup module 20, a FAIL message is triggered, as depicted by S90. If the summer and winter solstice dates 28, 30 are in accordance, the process continues S100 by reading parameters set in the daily alarm and announcements program 12*c* of the interactive device 10. The process continues S110, by the setup module 20 assessing that the function field 32 and setting fields 34*a*, 34*b* (illustrated in FIG. 3) are set in accordance to their relative fields 68, 70*a*, 70*b* as set in the setup module 20. If the values are not in accordance, a FAIL message is triggered, as depicted in S120. If the values are in accordance, a PASS message is generated as depicted in S130. A PASS message indicates that the interactive device 10 has been satisfactorily programmed in accordance to the values set in the setup module 20. When the PASS message is generated, the display screen 40 indicates the test was successful, and a green light 76 is illuminated upon the setup module 20. In addition, the setup module 20 generates an audible alarm alerting the manufacturer that the interactive device 10 has successfully passed the test. After multiple interactive devices 10 are programmed and time/date synchronized through the use of the setup module 20, it is contemplated that some very small, downstream deviation in the time settings of such interactive devices 10 may ultimately occur, such deviation being attributable to the internal clocks of the interactive devices 10 being run at a lower oscillation frequency and a lower power consumption level to maximize the life of the on-board battery.

Similar to the above-described embodiment in which the setup module 20 tests the satisfactory programming of the interactive device 10, a related procedure is contemplated for the embodiment of synchronizing interactive devices 10 in a local area without the setup module 20. Referring again to the flowchart of FIG. 18, the method continues with a step 306 of receiving a confirmation message 82 from the secondary interactive device 10*b*. The confirmation message 82 is understood to include an updated set of clock values that are newly retrieved from the memory 15*b* of the secondary interactive device 10*b*. Upon receipt of the confirmation message 82, its constituent parts, i.e., the date 24, the time 26, the summer solstice date 28, the winter solstice date 30, and data for the function field 32, and setting fields 34*a*, 34*b* are validated in a step 308 based upon an evaluation of those clock values being within the acceptable deviation range to a newly derived set of real time clock values of the primary interactive device 10*a* in the manner described above.

Figure 16:
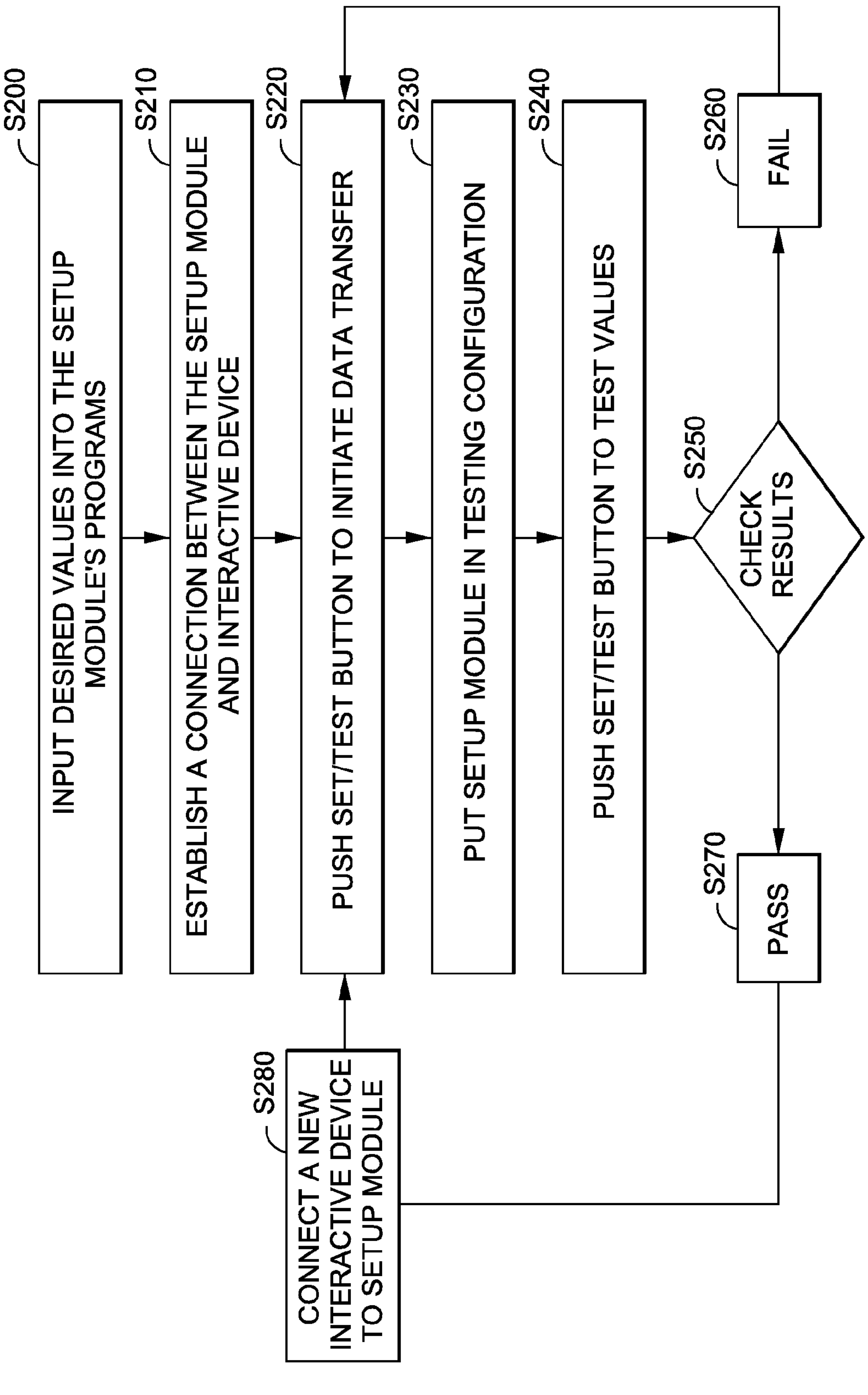
FIG. 16 illustrates a flowchart depicting a sequence of steps that occur for a setup module to time synchronize multiple interactive devices, such that each interactive device is running precisely the same time.

Further in accordance with the present invention, there is also provided a method for date and time synchronizing an interactive device 10. In this regard, the setup module 20 is capable of date and time synchronizing multiple interactive devices 10 such that their clock calendar programs 12*a* read the same date 24 and time 26. FIG. 16 is a flowchart depicting a series of interactions between a setup module 20 and multiple interactive devices 10, such that each interactive device 10 is time synchronized. The method begins at S200 by inputting the requisite parameters into the setup module 20. This includes the obligatory values set in the calendar clock program 36*a*, the daylight savings program 36*b*, the daily alarm and announcements program 36*c*, and the margin of error program 36*d*. The values that are initially programmed into the setup module 20 will be transferred into the programs 12*a*-12*c* of the interactive devices 10. The method continues by establishing a connection S210 between the setup module 20 and a first interactive device 10. Subsequently, the method continues S220 by pushing the SET/TEST button 46 to initiate a data transfer between the setup module 20 and the first interactive device 10.

Upon a successful data transfer, the method continues S230 by utilizing the setup module 20 to test the first interactive device 10, ensuring that the transferred values are in accordance with the values as set in the setup module 20. The method continues at S240 by pushing the SET/TEST button 46 to initiate the testing sequence as described above and illustrated in FIG. 16. The method continues at S250 by checking the results of the testing sequence. If the test was unsuccessful S260, indicating a discrepancy between the data set in the first interactive device 10 and the setup module 20, the method continues by performing steps S220-S240 again. In the alternative S270, a successfully tested first interactive device 10 is now programmed with the parameters stored in the setup module 20. In this regard, the date 24 and the time 26 as set in the calendar clock program 12*a* are precisely the same as the date 54 and the time 56 set in the setup module 20. Therefore, the first interactive device 10 is date and time synchronized in accordance to the setup module 20.

The method continues at S280 by connecting a second interactive device 10 to the setup module 20 and performing steps S220-S250. Upon a successful data transfer S270 into the second interactive device 10, both first and second interactive devices 10 are date and time synchronized with respect to each other and the setup module 20.

Figure 17:
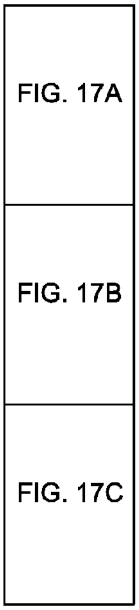
FIGS. 17A-17C illustrate a flowchart depicting an exemplary sequence of steps that may be used to facilitate the manual programming of an interactive device by an end user.
Figure 17A:
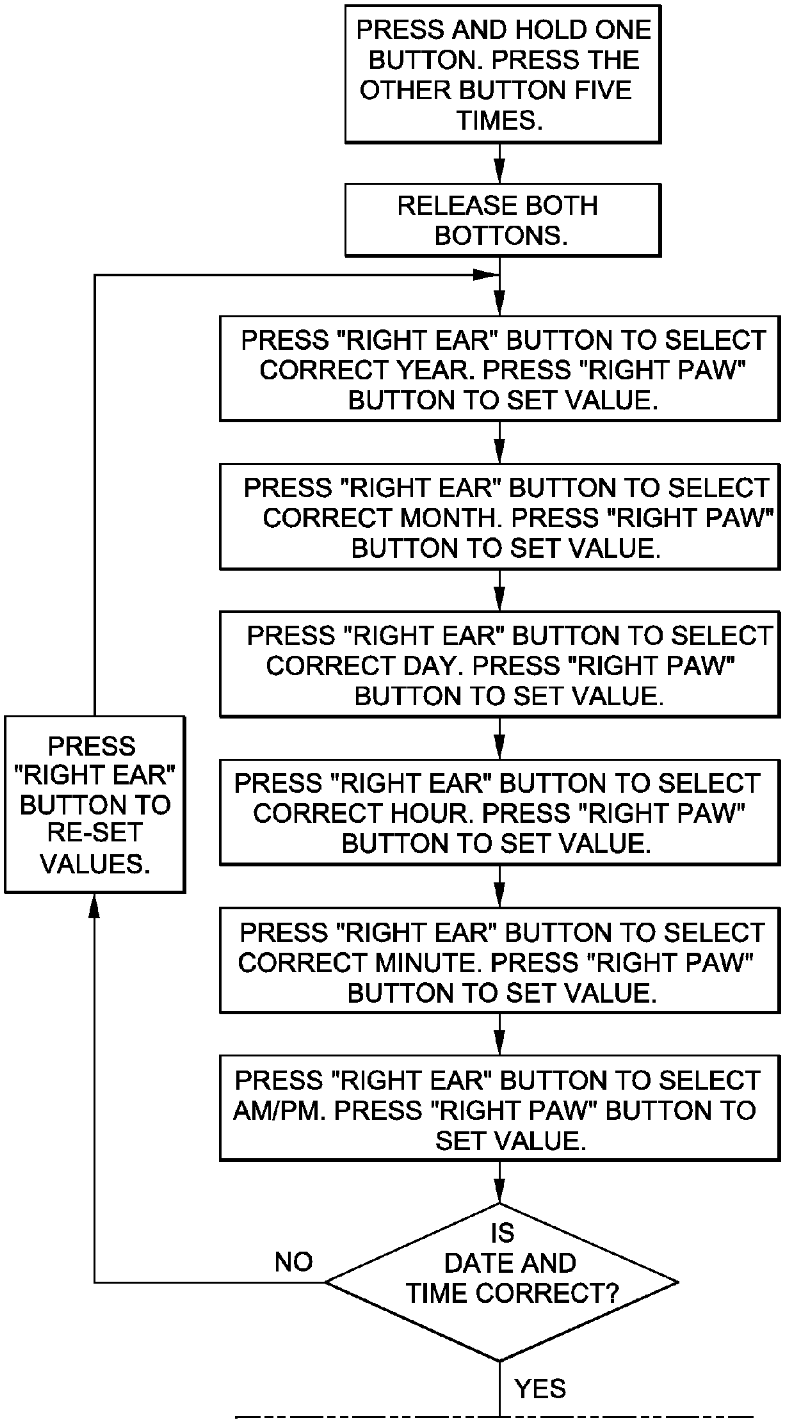
Figure 17B:
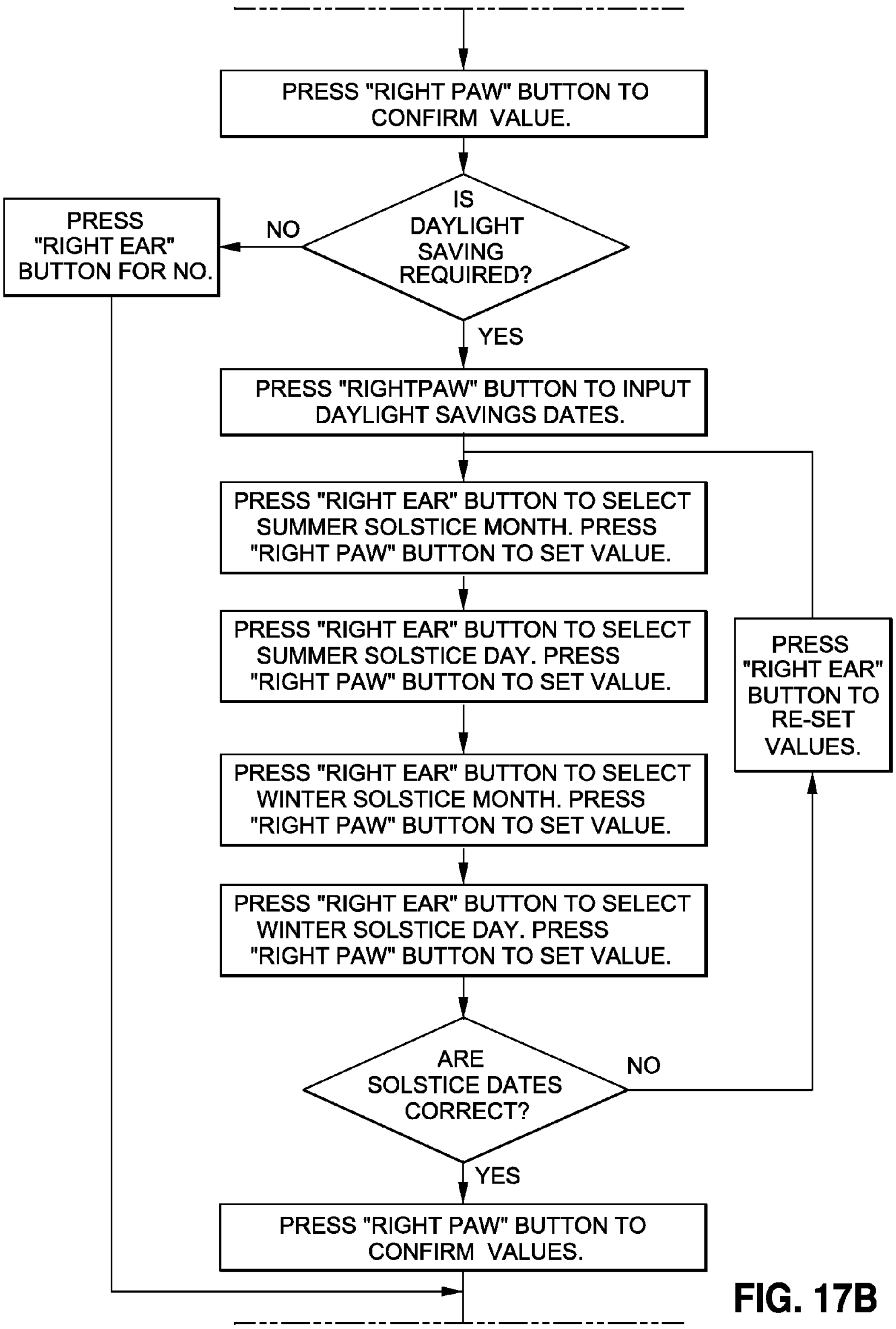
Figure 17C:
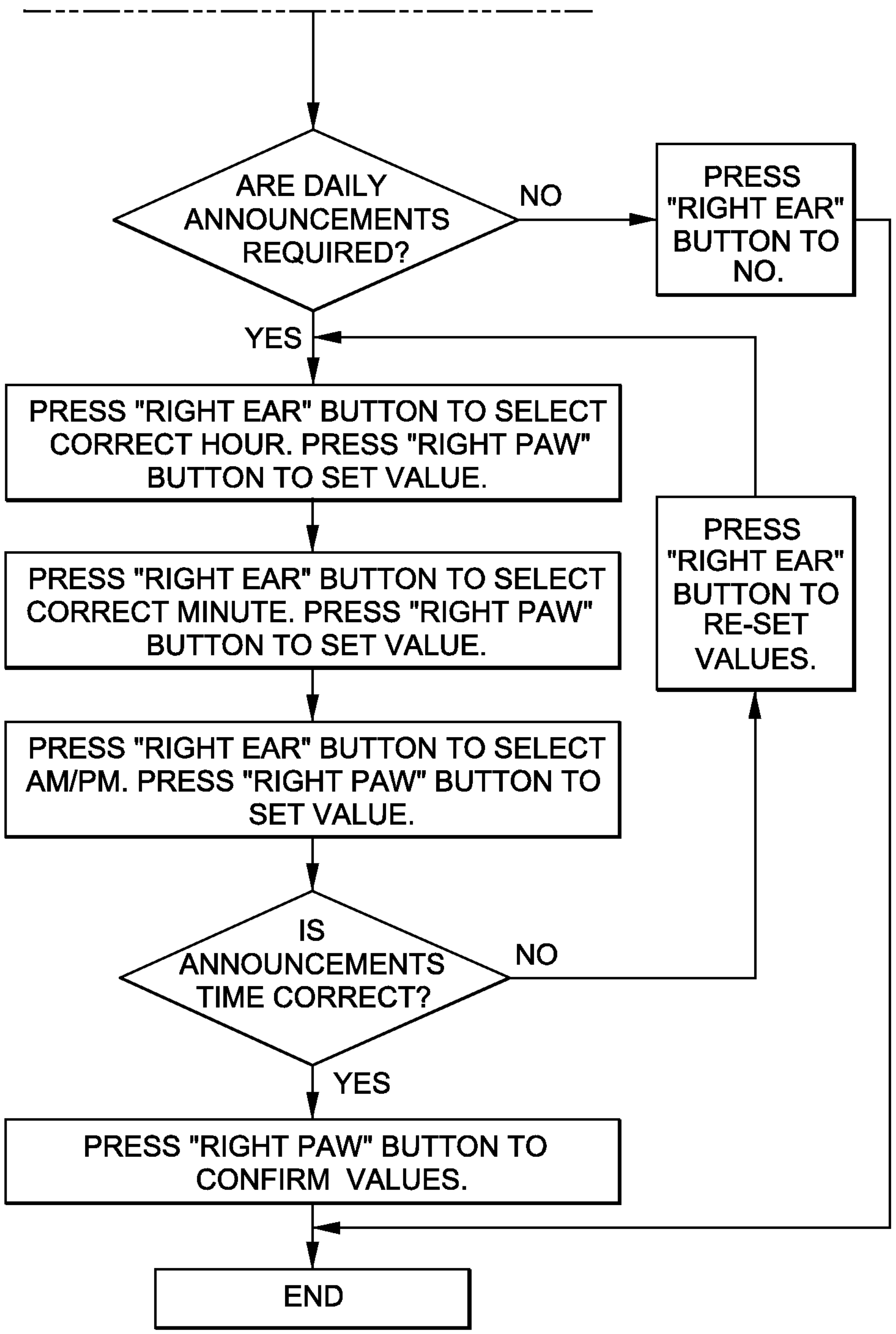

As will be recognized by those of ordinary skill in the art, the structural and functional attributes of the interactive device 10 considered in combination with those of the setup module 20 allows a plurality of interactive devices 10 to be programmed (e.g., date and time synchronized) in a manner which allows such interactive devices 10 to generate a prescribed response at the same time. It is contemplated that the particular date and time at which the response is generated will correspond to the ultimate shipment destination of the interactive devices 10 which is typically known by the manufacturer at the time and point of origin of manufacture. In view of this functionality, the interactive devices 10 may be more marketable to consumers when viewed upon a retail shelf while generating audio and/or visual messages in concert. Moreover, by time synchronizing the interactive devices 10 in the above-described manner, the ultimate purchaser of each such interactive device 10 may be alleviated from the burden of having to undertake a time consuming, difficult programming task as would otherwise be needed to cause the interactive device 10 to function in the desired manner. Though the time and date data of each interactive device 10 may optionally be "customized" by an end purchaser, the time and date data initially input into the device 10 at the point of origin, which as indicated above is preferably destination specific, does not mandate such customization in order to achieve a requisite level of functionality. This functionality enhances the marketability and appeal of the interactive device 10 since the time and date data is onboard the interactive device 10 while on a store shelf without the need for any retailer or end user involvement. However, in the event such customization is desired, an exemplary protocol which may be implemented by an end user to facilitate the manual programming of an interactive device 10 is shown in the flowchart of FIG. 17.

The particulars shown herein are by way of example and for the purpose of illustrative discussion of the embodiments of the present invention only and are presented in the cause of providing what is believed to be the most useful and readily understood description of the principles and conceptual aspects of the present invention. In this regard, no attempt is made to show any more detail than is necessary for the fundamental understanding of the present invention, the description taken with the drawings making apparent to those skilled in the art how the several forms of the present invention may be embodied in practice.

What is claimed is:

1. An interactive device, comprising:

a communications module linkable to a corresponding communications module of a local, peer secondary interactive device;

a memory for storing a set of clock values including a time component and a date component; and a computer processor connected to the communications module and the memory, the computer processor being programmed to actively maintain a real-time clock and calendar based upon the set of clock values stored in the memory;

wherein the set of clock values stored in the memory are transferable by the communications module to a corresponding clock of the peer secondary interactive device upon a selective designation of a primary status based on an evaluation of recency of at least a one of updates to the set of clock values and confirmations of accuracy of the set of clock values against the peer secondary interactive device, and the set of clock values are stored in a corresponding memory of the peer interactive device.

2. The interactive device of claim 1, wherein the communications module of the interactive device is an infrared transceiver.

3. The interactive device of claim 1, wherein the communications module of the interactive device is a radio frequency (RF) transceiver.

4. The interactive device of claim 1, wherein the communications module of the interactive device is an optical transceiver.

5. The interactive device of claim 1, wherein the communications module includes an input/output port connectible to an input/output port of the other interactive device over a wired link.

6. The interactive device of claim 1, further comprising:

an input device connected to the computer processor for inputting a new set of clock values replacing the stored set of clock values.

7. The interactive device of claim 1, wherein the clock values include a daylight savings component and an event component.

8. The interactive device of claim 7, further comprising:

a daylight savings module operative to adjust the time component of the set of clock values to move forward by one hour on a summer solstice date, and move backward by one hour on a winter solstice date.

9. The interactive device of claim 1, further comprising:

a daily alarm and announcements program operative to activate any one of a plurality of stored functions on a corresponding stored date component at a corresponding stored time component.

10. The interactive device of claim 9, wherein the daily alarm and announcements program stores the functionality of an Advent calendar.

11. The interactive device of claim 1, further comprising:

a body housing the communications module, the memory, and the computer processor, the body defining a toy with animation features.

12. The interactive device of claim 11, wherein the animation feature is an audio sequence.

13. The interactive device of claim 11, wherein the animation feature is a visual sequence.

14. The interactive device of claim 11, wherein the animation feature is a sequence of movements performed by the toy.

15. The interactive device of claim 11, further comprising:

at least one motor; and a plurality of actuators controlled by the computer processor and connecting the movable features to the motor.

16. An interactive device, comprising:

a communications module linkable to a corresponding communications module of a local, peer secondary interactive device;

a memory for storing a set of clock values including a time component; and a computer processor connected to the communications module and the memory, the computer processor being programmed to actively maintain a real-time clock based upon the set of clock values stored in the memory;

wherein the set of clock values stored in the memory are transferrable by the communications module to a corresponding clock of the peer secondary interactive device upon a selective designation of a primary status based on an evaluation of recency of at least a one of updates to the set of clock values and confirmations of accuracy of the set of clock values against the peer secondary interactive device, and the set of clock values are stored in a corresponding memory of the peer secondary interactive device.

17. The interactive device of claim 16, wherein the communications module of the interactive device is an infrared transceiver.

18. The interactive device of claim 16, wherein the communications module of the interactive device is a radio frequency (RF) transceiver.

19. The interactive device of claim 16, wherein the communications module of the interactive device is an optical transceiver.

20. The interactive device of claim 16, wherein the communications module includes an input/output port connectible to an input/output port of the peer secondary interactive device over a wired link.

21. The interactive device of claim 16, further comprising:

a daily alarm and announcements program operative to activate any one of a plurality of stored functions on a corresponding stored time component.

22. The interactive device of claim 16, further comprising:

an input device connected to the computer processor for inputting a new set of clock values replacing the stored set of clock values.

23. The interactive device of claim 16, further comprising:

a body housing the communications module, the memory, and the computer processor, the body defining a toy with animation features.

24. The interactive device of claim 23, wherein the animation feature is an audio sequence.

25. The interactive device of claim 23, wherein the animation feature is a visual sequence.

26. The interactive device of claim 23, wherein the animation feature is a sequence of movements performed by the toy.

27. The interactive device of claim 23, further comprising:

at least one motor; and a plurality of actuators controlled by the computer processor and connecting the movable features to the motor.

28. A method for synchronizing clocks of one or more local, peer secondary interactive devices from a primary interactive device, the method comprising:

receiving an initial set of clock values on a primary interactive device;

setting a status token on the primary interactive device;

transmitting a synchronization message including a set of real time clock values actively maintained based upon the initial set of clock values and the status token to one or more local, peer secondary interactive devices; and receiving a confirmation message from a respective one of the peer secondary interactive devices, the confirmation message including an updated set of clock values retrieved from the respective one of the peer secondary interactive devices.

29. The method of claim 28, wherein prior to transmitting the synchronization message to the one of the peer secondary interactive devices, the method includes:

establishing a communications link between the primary interactive device and the respective one of the peer secondary interactive devices.

30. The method of claim 28, further comprising:

storing the set of real-time clock values on the respective one of the peer secondary interactive devices.

31. The method of claim 28, wherein the clock values include a date component with an month value, a day value, and a year value.

32. The method of claim 28, wherein the clock values include a time component with an hour value, a minute value, a second value, and a post/ante meridiem value.

33. The method of claim 28, wherein the clock values include a daylight savings component.

34. The method of claim 28, wherein the clock values include an event component with a daily alarm value and a corresponding announcement value.

35. The method of claim 28, further comprising:

validating the clock of the respective one of the peer secondary interactive devices based upon an evaluation of the updated set of clock values retrieved from the respective one of the peer secondary interactive devices being within an acceptable deviation range of a newly derived set of real time clock values from the primary interactive device.

* * * * *

UNITED STATES PATENT AND TRADEMARK OFFICE

CERTIFICATE OF CORRECTION

PATENT NO. : 8,583,956 B2
APPLICATION NO. : 12/577957
DATED : November 12, 2013
INVENTOR(S) : Fong et al.

It is certified that error appears in the above-identified patent and that said Letters Patent is hereby corrected as shown below:

Title Page, Item [54] and in the Specification, Column 1, Line 1, Title should read:
"INTERACTIVE DEVICE WITH LOCAL AREA TIME SYNCHRONIZATION CAPABILITY"

In the Claims

Column 17, Claim 1 at Line 42: "peer interactive device" should read "peer secondary interactive device"

Signed and Sealed this
Seventh Day of January, 2014

Margaret A. Focarino
*Commissioner for Patents of the United States Patent and Trademark Office*